(12) United States Patent
Topfer et al.

(10) Patent No.: US 7,832,928 B2
(45) Date of Patent: Nov. 16, 2010

(54) DARK CORRECTION FOR DIGITAL X-RAY DETECTOR

(75) Inventors: Karin Topfer, Rochester, NY (US); Richard T. Scott, Hilton, NY (US); John W. DeHority, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 157 days.

(21) Appl. No.: 12/196,792

(22) Filed: Aug. 22, 2008

(65) Prior Publication Data

US 2010/0020933 A1    Jan. 28, 2010

Related U.S. Application Data

(60) Provisional application No. 61/083,343, filed on Jul. 24, 2008.

(51) Int. Cl.
*G01D 18/00* (2006.01)
*H05G 1/64* (2006.01)

(52) U.S. Cl. .................. 378/207; 378/98.8; 378/98.12; 250/370.09

(58) Field of Classification Search ............... 378/98.8, 378/98.12, 207; 250/370.09
See application file for complete search history.

(56) References Cited

U.S. PATENT DOCUMENTS

| | | | |
|---|---|---|---|
| 5,046,118 A | 9/1991 | Ajewole et al. | |
| 5,877,501 A * | 3/1999 | Ivan et al. | 250/370.09 |
| 6,144,408 A | 11/2000 | MacLean | |
| 6,265,720 B1 * | 7/2001 | Yamazaki et al. | 250/370.09 |
| 6,497,511 B1 * | 12/2002 | Schmitt et al. | 378/207 |
| 6,904,126 B2 * | 6/2005 | Endo | 378/98.8 |
| 6,919,568 B2 * | 7/2005 | Odogba et al. | 250/370.09 |
| 6,937,772 B2 | 8/2005 | Gindele | |
| 7,006,599 B2 * | 2/2006 | Okamura et al. | 378/98.11 |
| 7,026,608 B2 * | 4/2006 | Hirai | 250/252.1 |
| 7,092,017 B2 | 8/2006 | Kelly et al. | |
| 7,113,565 B2 | 9/2006 | Endo | |
| 7,208,717 B2 | 4/2007 | Partain et al. | |
| 7,330,208 B2 | 2/2008 | Compton et al. | |
| 7,381,964 B1 * | 6/2008 | Kump et al. | 250/370.11 |
| 7,399,974 B2 * | 7/2008 | Spahn | 250/370.09 |

(Continued)

FOREIGN PATENT DOCUMENTS

DE    10 2005 043 048    3/2007

(Continued)

OTHER PUBLICATIONS

Seibert et al., "Flat-filed correction technique for digital detectors," Proc. SPIE, vol. 3336, 1998, pp. 348-354.

(Continued)

*Primary Examiner*—Allen C. Ho

(57) ABSTRACT

A method of forming an offset-corrected exposure image includes obtaining an initial exposure image and exposure metadata related to the initial exposure image. An intermediate offset-corrected exposure image is formed by obtaining one or more dark images associated with the initial exposure image and subtracting an averaged value of the one or more dark images from the initial exposure image. The offset-corrected exposure image is obtained by combining an offset adjustment map with the intermediate offset-corrected exposure image.

25 Claims, 22 Drawing Sheets

U.S. PATENT DOCUMENTS

| | | | |
|---|---|---|---|
| 7,421,063 B2 * | 9/2008 | Takenaka et al. | 378/116 |
| 7,553,081 B2 * | 6/2009 | Ritter et al. | 378/207 |
| 7,729,527 B2 * | 6/2010 | Maschauer et al. | 382/132 |
| 2003/0223539 A1 | 12/2003 | Granfors et al. | |
| 2004/0146189 A1 | 7/2004 | Langan | |
| 2007/0065038 A1 | 3/2007 | Maschauer et al. | |
| 2007/0102643 A1 | 5/2007 | Liu et al. | |
| 2008/0094490 A1 | 4/2008 | Compton et al. | |

FOREIGN PATENT DOCUMENTS

| | | |
|---|---|---|
| WO | WO 83/00970 | 3/1983 |
| WO | WO 2007/110798 | 10/2007 |

OTHER PUBLICATIONS

Moy et al., "How does real offset and gain correction affect the DQE in images from X-ray Flat detectors," Proc. SPIE, 3659, 1999, pp. 90-97.

Wischmann et al., "Correction of Amplifier Non-Linearity, Offset, Gain, Temporal Artifacts, and Defects for Flat Panel Digital Imaging Devices," Proc. SPIE, vol. 4682, 2002, pp. 427-437.

Streeter, Robert A., *Technology and applications of amorphous silicon*, Berlin: Springer Verlag: 1999, Chapter 4.

Roos et al., "Multiple gain ranging readout method to extend the dynamic range of amorphous silicon flat panel imagers," Proc. SPIE, vol. 5368, 2004, pp. 139-149.

Rodricks et al., "Filtered gain calibration and its effect on DQE and image quality in digital imaging systems," Proc. SPIE, vol. 3977, pp. 476-485.

Couwenhoven et al., "Enhancement method that provides direct and independent control of fundamental attributes of image quality for radiographyic imagery," SPIE, vol. 5367, 2004, pp. 474-481.

Schmidgunst et al., "Calibration model of a dual gain flat panel detector for 2D and 3D x-ray imaging," Med. Phys., 34 (9), 2007,pp. 3649-3664.

* cited by examiner

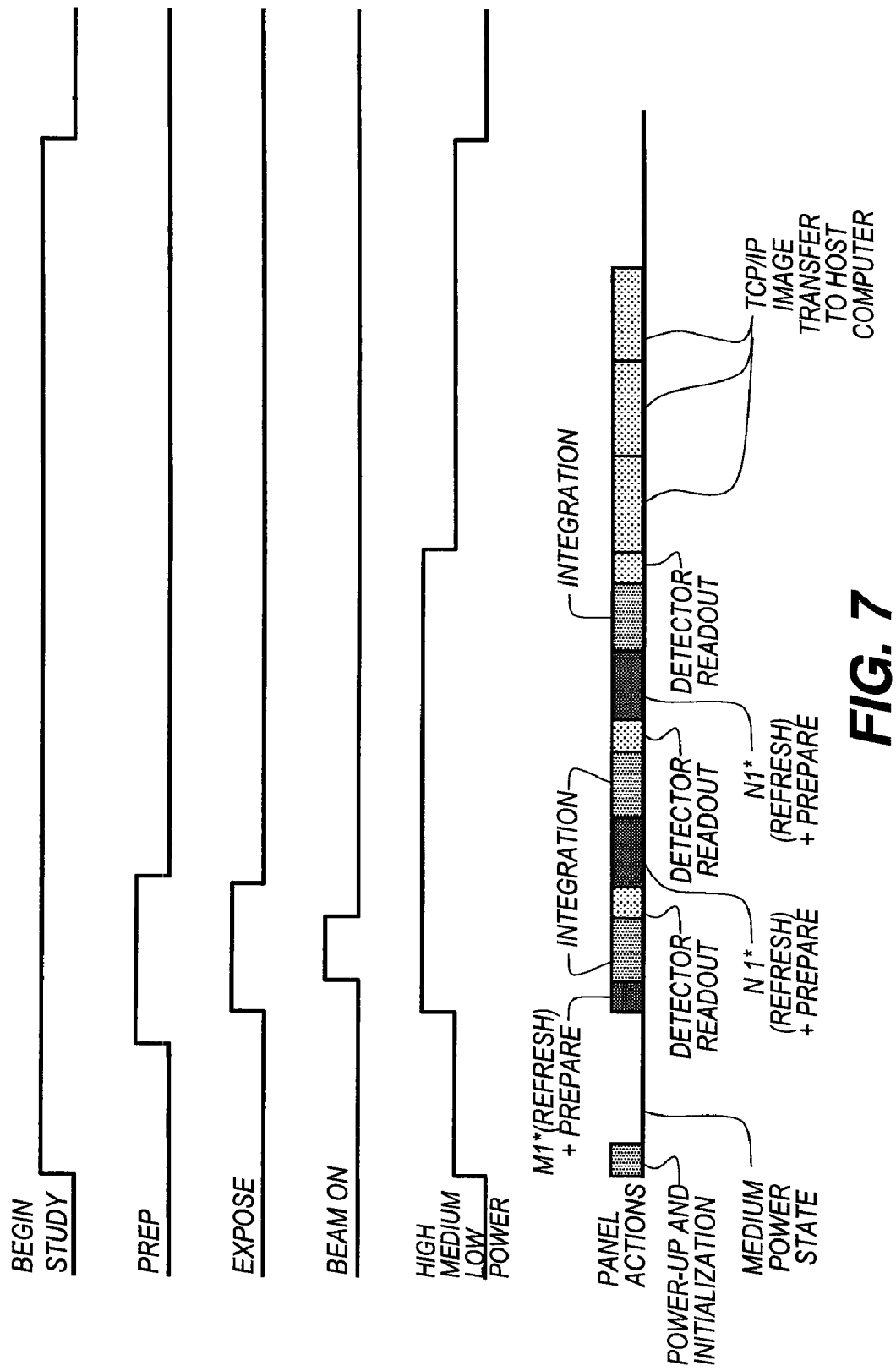

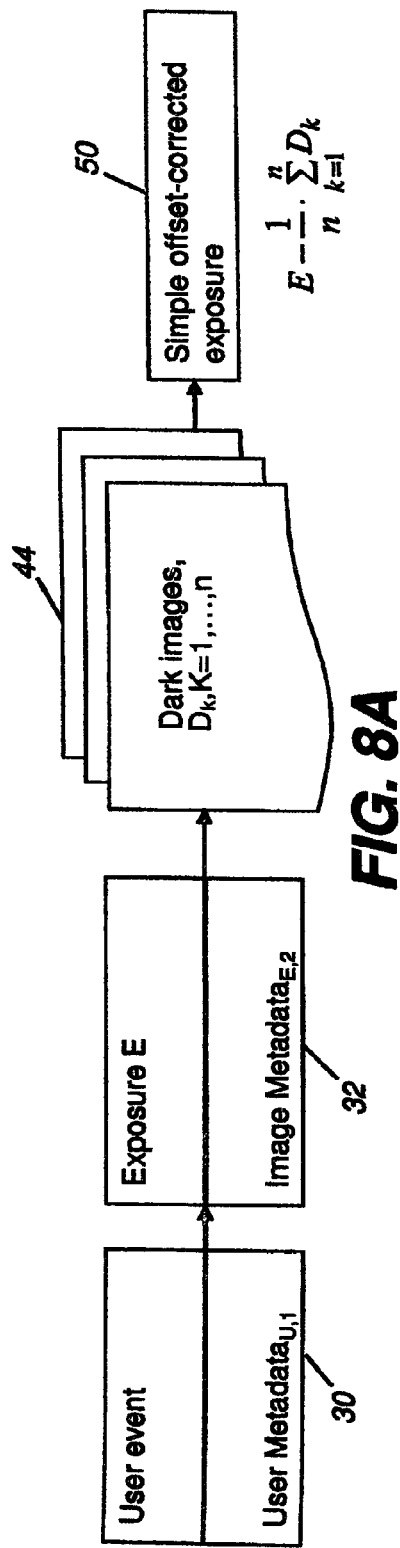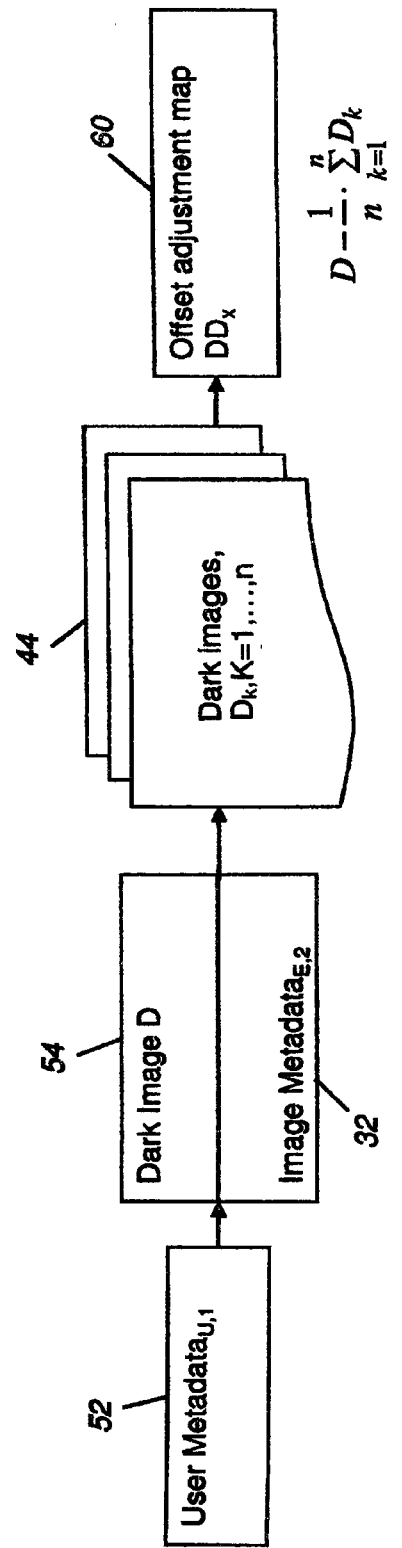

DARK CORRECTION FOR DIGITAL X-RAY DETECTOR

CROSS-REFERENCE TO RELATED APPLICATION

Reference is made to, and priority is claimed from, U.S. Provisional Patent Application No. 61/083,343, filed 24 Jul. 2008, entitled OPTIMIZED OPERATION AND OFFSET CORRECTIONS FOR A BATTERY-POWERED, WIRELESS DIGITAL X-RAY DETECTOR, to Topfer et al, which provisional application is hereby incorporated by reference.

FIELD OF THE INVENTION

The present invention relates to methods for providing compensation for image data anomalies in battery-operated digital radiography detectors and more particularly relates to a method for dark correction in digital radiography.

BACKGROUND OF THE INVENTION

Digital radiography (DR) is increasingly accepted as an alternative to film-based imaging technologies that rely on photosensitive film media. With DR, a detector panel or Flat Panel Detector (FPD) provides an array of sensing circuits that convert levels of radiation exposure captured on radiation-sensitive layers to electronic image data. The image photosensors are typically metal-insulator-semiconductor (MIS) diodes or PIN (P-type, Intrinsic, N-type) diodes or some other photosensor type. The array of image pixel data that is obtained from the DR detector is then stored in memory circuitry for subsequent read-out, processing, and display on suitable electronic image display devices.

FIG. 1 illustrates a cross-sectional view of a conventional DR panel 10 with a flat panel detector 20. A scintillator 14 has a material, such as gadolinium oxisulfide, $Gd_2O_2S$:Tb (GOS) or cesium iodide, that absorbs x-rays incident thereto and converts the x-ray energy to visible light photons. Flat panel detector 20 is physically adjacent to the scintillator (GOS) layer, and includes an array of light sensitive pixels 24 arranged in a matrix of rows and columns. The pixels 24 are connected to readout elements 25. As shown at enlarged section E of FIG. 1, each pixel 24 has one or more photosensors 22, such as a PIN diode or other light-sensitive component, and an associated switch element 26 of some type, such as a thin film transistor (TFT).

Flat panel detector 20 is typically formed using hydrogenated amorphous silicon (a-Si:H). Pixels 24 on this a-Si:H array record the intensity of the light output from the GOS or other scintillator 14 layer upon absorption of an x-ray. The light sensitive components of the a-Si:H pixels convert the incident light into electrical charge which is stored in the internal capacitance of pixel 24. The magnitude of the stored electrical charge is related to the intensity of the excited light, which is, in turn, related to the intensity of the incident x-rays. The readout of the image information is performed by peripheral electronic circuitry that connects to the edge of the a-Si:H array and is represented as readout elements 25 in FIG. 1. The charge readout from each individual pixel is converted to a digital value in an analog to digital converter (ADC) that is linked to the readout circuitry. The digital values are then transferred to the external system via standard data communication means, such as a wired or wireless data link.

The conventional DR panel receives its operating power from an external source, routed to the panel by means of a cable, tether, or other interconnection device. In the conventional arrangement, operating power is provided continuously to the DR panel. This mode of operation is suitable for conventional, large-scale digital radiographic installations, where the FPD is permanently installed at a predetermined optimum fixed location for patient imaging. This type of installation is typically set up for obtaining a standardized set of radiological images that are routinely needed for a large number of patients. After a warm-up period following power-up, the DR panel reaches a stable operating state that is maintained during and between imaging sessions for a succession of patients. Even when the panel is not capturing images it goes through repeated cycles of reset/refresh, integration, and readout functions, in an automated sequence. Most panels also perform automatic periodic dark calibrations to compensate for temperature drifts and other factors that can affect image quality.

It is known in the art that even continuously operating FPDs exhibit pixel-to-pixel variations in sensitivity and dark current. These variations, sometimes referred to as fixed pattern noise, may result in perceptible nonuniformities in diagnostic X-ray images and thereby interfere with the detection of disease features. Thus, compensation algorithms are necessary, such as those described by James A. Seibert, John M. Boone, and Karen K. Lindfors in "Flat-field correction technique for digital detectors," *Proc. SPIE Vol.* 3336, 1998, p. 348-354; by Jean-Pierre Moy and B. Bosset in "How does real offset and gain correction affect the DQE in images from x-ray flat detectors?" *Proc. SPIE*, 3659, 1999, pp. 90-97; and by Hans-Aloys Wischmann, Hans A. Luijendijk, Henk J. Meulenbrugge, Michael Overdick, Ralf Schmidt, and Kourosh Kiani in "Correction of amplifier nonlinearity, offset, gain, temporal artifacts, and defects for flat-panel digital imaging devices," *Proc. SPIE Vol.* 4682, 2002, p. 427-437.

The most basic calibration and correction algorithms generally include 2 steps. First, the dark signal of the detector (that is, the signal in the absence of any X-ray exposure) is obtained. Pixel by pixel variations in the dark signal of the detector are characterized to form a dark or offset map containing the dark variations. The offset map is then subtracted from the X-ray exposure in a process termed dark or offset correction. Second, the variations in the sensitivity of the pixels are characterized. This is done by capturing one or more flat field exposures, which are then offset-corrected. The resulting image is the gain map. In the gain correction step, the offset-corrected X-ray exposure is divided by the gain map. Ideally this two-step procedure compensates for any fixed pattern noise introduced by the detector.

While these two operations seem straightforward, both gain and offset maps have some inherent noise, both may drift over time, and they may exhibit differences depending on previous exposures taken by the detector. Some of these variations are related to the temperature sensitivity of amorphous silicon and to the tendency of this material to trap charge from previous exposures (See, for example, Street, Robert A., *Technology and applications of amorphous silicon*, Berlin: Springer Verlag; 1999, Chapter 4). Likewise, drift may occur due to readout electronics. Consequently, significant effort has been dedicated to improving the performance and efficiency of the gain and offset corrections.

For example, it is well known in the art that individual dark captures and flat field exposures contain electronic and X-ray quantum noise, respectively. Thus, several captures of each must be averaged to obtain gain and offset maps with reduced noise levels. Noise inherent in those correction maps would propagate to the final corrected X-ray exposure and could potentially interfere with clinical diagnoses. The need for averaging was anticipated by Moy and Bosset; Pieter G. Roos et al., "Multiple-gain-ranging readout method to extend the dynamic range of amorphous silicon flat-panel imagers," *Proc. of SPIE,* 5368, 2004, pp. 139-149; and by Tadeo Endo in "Radiological imaging apparatus and method," U.S. Pat. No. 7,113,565 B2.)

The block diagrams of FIGS. 2 and 3 show conventional approaches for performing offset corrections. Using the sequence shown in FIG. 2, a number n of dark images D are obtained after the actual exposure E. Dark images D are then averaged using the calculation shown, and the average is subtracted from the exposure E data to obtain the offset-corrected exposure image. In the sequence of FIG. 3, n dark images D are obtained prior to the exposure E, and the same combination logic is used to obtain the offset-corrected exposure image.

Some effort has been made to capture the minimum necessary number of flat field and dark images for gain and offset corrections without negatively affecting the noise in the corrected image. Such solutions include frequency decomposition to reduce high frequency noise in the gain map (Brian G. Rodricks, Denny L. Lee, Michael G. Hoffberg, and Cornell L. Williams, "Filtered gain calibration and its effect on DQE and image quality in digital imaging systems," *Proc. SPIE Vol.* 3977, p. 476-485) and periodic weighted updates of the existing offset map, as described in U.S. Patent Application Publication No. US2003/0223539 entitled "Method and apparatus for acquiring and storing multiple offset corrections for amorphous silicon flat panel detector," by Granfors et al. The latter method, wherein a single dark image is captured periodically between exposures and weighted with the existing offset map, is well suited for conventional FPDs running continuously in a stable environment. In this environment, the method described in the '539 Granfors et al. publication captures long term drifts, while reducing noise by averaging multiple dark captures.

Subtraction of the appropriate dark signal in the offset correction is important because any discrepancy between the actual dark level that was present during the exposure and the subtracted offset map is amplified by subsequent correction steps. One of the mechanisms that may change the dark level for a continuously running FPD is image lag, a problem familiar to those skilled in the diagnostic imaging field. Image lag is unwanted charge retention from frame to frame due to incomplete readout of the photodiode, afterglow of the scintillator, trapped charge in the a-Si photodiode and/or other causes. Image lag may be of some concern in cases where dark images are obtained after image capture. The residual image decays over time in a predictable fashion and can be corrected as disclosed by Partain et al. in U.S. Pat. No. 7,208,717 entitled "Method and apparatus for correcting excess signals in an imaging system." Image lag is proportional to exposure, and its magnitude can be estimated by taking the difference of two dark frames captured at known time intervals after the exposure. Lag correction is mainly of concern for panels running continuously in fluoroscopic mode and panels that switch between high-dose radiographic images and low-dose fluoroscopic images.

While gain and offset corrections pose some challenges for continuously running FPDs, correction algorithms are expected to become more complex as portable, untethered DR panels, which encounter less stable operating conditions, become more prevalent. Untethered DR operation offers some promise of improved patient care, with advantages including improved operator workflow and equipment adaptability. In untethered operation, a portable FPD can be readily positioned behind the patient, rather than requiring the patient to take an awkward position for imaging. In many cases, an untethered flat panel detector can replace the need for multiple conventional detectors, since the same detector can be used both in a wall-mount position and a horizontal table position. The portable, battery-powered FPD has the flexibility of being easily and quickly movable to any suitable location for DR imaging, yet still provides immediate access to the acquired x-ray image. The portable, cassette-type FPD, in turn, allows smaller and more portable x-ray imaging systems to be used. In some cases, portable DR panels can be used where conventional tethered DR panels are not well-suited for patient imaging, and can obviate the need to return to the use of older technologies, such as the use of a storage phosphor computed radiography (CR) X-ray cassette.

Battery power offers considerable benefit, however, there are drawbacks associated with battery use, including the need for battery power conservation when not in use. Battery conservation means that some type of "standby" power level be provided, so that the DR panel can be maintained in a state of readiness, but without drawing the full amount of battery current that is needed for operation until necessary. Any type of power mode switching, however, can have a negative impact on image quality.

Because of the temperature sensitivity of amorphous silicon mentioned previously (cf. R. A. Street reference), the change of power modes, such as to provide "standby" and operation modes, brings with it the likelihood of rapidly changing temperature profiles over the full detector area. This includes both global and local changes, because some electronic components heat up faster than others. Rapid local or global changes in temperature are likely to cause a range of imaging anomalies. DR panel imaging characteristics immediately following a change in operating power can differ measurably from imaging characteristics a few minutes later. This is one reason why the straightforward correction sequences of FIGS. 2 and 3 fall short of what is needed for dark correction in portable DR applications. First of all, workflow considerations may limit the number of dark images that can be taken before the exposure. Ideally, the detector must be ready for the X-ray capture as soon as possible after its transition from the standby mode. Moreover, where there is a rapidly changing temperature profile, a dark image taken immediately after the exposure may not be representative of the dark level that was actually present during the exposure.

The task of properly characterizing and compensating for variations in imaging performance for a portable battery-operated DR panel is complicated by the nature of its use and operation. The panel may be used in different rooms and for different tasks that vary in usage pattern and temperature environment. In an intensive-care unit (ICU), for example, there may be no standard usage pattern or regular timing that could help to predict the amount of compensation needed at any particular point. Instead, use of the DR panel can be more randomized and asynchronous, requiring some adaptive method for proper characterization and calibration.

Thus, although portable, battery-operated DR panels offer clear advantages for operator workflow and improved patient care, these devices present a particular challenge to the task of obtaining a quality diagnostic image. The new set of problems introduced by using on-board battery power for the DR panel requires solutions that minimize the impact of power cycling and uneven heat build-up on the image data that is obtained.

SUMMARY OF THE INVENTION

It is an object of the present invention to address the need for improved dark correction in a portable, battery operated digital radiography detector. With this object in mind, the present invention provides a correction method for forming an offset-corrected exposure image from a digital X-ray detector. The method includes: a) obtaining an initial exposure image and associated exposure metadata about capture conditions under which the exposure image was captured; b) forming an intermediate offset-corrected exposure image by obtaining one or more dark images associated with the initial exposure image and subtracting an averaged value of the one or more dark images from the initial exposure image; c) forming an offset adjustment map by combining stored dark image data from one or more previously captured dark images, according to the associated exposure metadata; and d) combining the offset adjustment map with the intermediate offset-corrected exposure image to form the offset-corrected exposure image.

In another aspect, the present invention provides a digital radiography detector that includes: a scintillator layer responsive to incident radiation; a detector array comprising a plurality of sensors, each sensor disposed to provide a signal corresponding to an amount of light received from the scintillator layer; embedded controller circuitry programmed with instructions to obtain an initial exposure image and associated exposure metadata about capture conditions under which the exposure image was captured, to form an initial offset-corrected exposure image by obtaining one or more dark images associated with the initial exposure image and subtracting an averaged value of the one or more dark images from the initial exposure image, to form an offset adjustment map by combining stored dark image data from one or more previously captured dark images, according to the associated exposure metadata, and to combine the offset adjustment map with the initial offset-corrected exposure image to form an offset-corrected exposure image Ed. The digital radiography detector also includes a battery providing power to electronic components of the detector array.

It is a feature of the present invention that it adapts to power mode transitions for a battery-powered DR detector.

It is an advantage of the present invention that it provides automatic correction for offset signal variation in a portable DR detector.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 7 is a timing diagram showing a full image capture cycle, including dark image capture, within a study with a single patient image in an embodiment in which the portable, battery-operated DR panel supports three different power states.

FIG. 8A is a block diagram illustrating the sequence for a single exposure in multi-capture mode.

FIG. 8B is a block diagram showing a sequence similar to that of FIG. 8A, in which the exposure is replaced with a dark image capture triggered by the embedded electronic circuitry without user intervention.

DETAILED DESCRIPTION OF THE INVENTION

Figure 1:
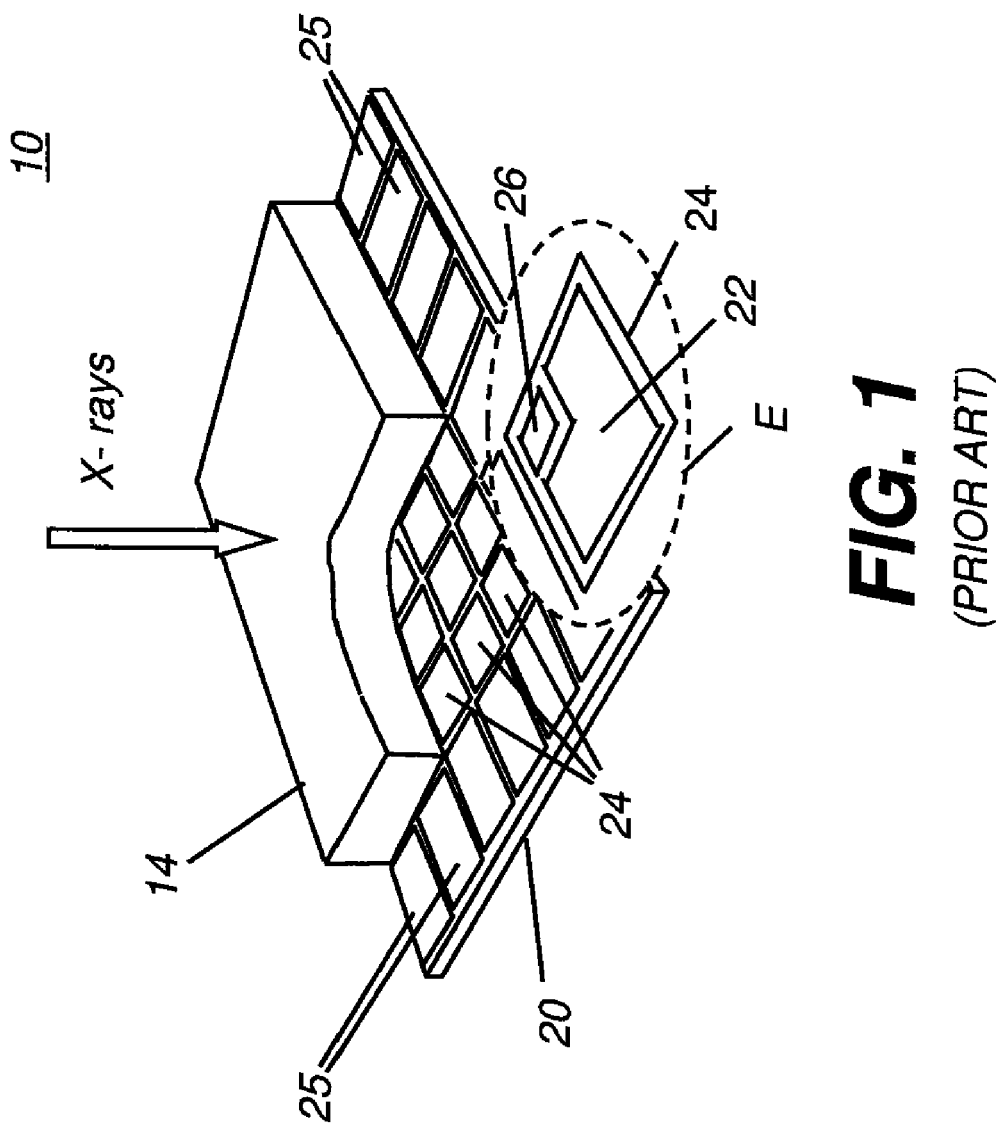
FIG. 1 is a perspective view, partially exploded, of a conventional digital radiography panel.

The present invention addresses the need for improved image quality with portable, battery-operated DR detectors by providing a more efficient and accurate method of performing offset corrections on captured X-ray images.

Although preferred embodiments of the invention will be discussed with regard to conserving energy to prolong battery life in a portable DR detector, it should be understood that the techniques and methods described herein also may be useful for conventional, plugged-in detectors in keeping with "green" or energy conservation initiatives, for example.

In the context of the present disclosure, the term "study" denotes a group of one or more images taken for one patient in a single session. For example, a study for a given patient may include one or more images of the left knee, taken from various sides and angles. The time interval between the images is variable. An average of three images per study is common for patient imaging, but smaller and larger numbers are possible. One of the random variables is the "time between images within a study." The time between patients (studies) is also a random variable. This means that during typical usage of DR detector 10 for general radiography purposes, patient images are taken asynchronously, at random time intervals.

Embodiments of the present invention provide dark correction for images obtained using digital radiography with a portable, battery-powered detector by taking into account various operational and timing factors for DR detector function. For example, in obtaining characterization information, embodiments of the present invention attempt to match the timing of the exposure cycle under given conditions of image capture in order to provide more accurate dark exposure data. Embodiments of the present invention may employ metadata about a user event, or use history about exposure conditions in order to select the appropriate stored dark image data, as described below.

As discussed in the Background section, above, a portable, untethered DR panel requires on-board battery power. Even if rechargeable batteries are used, the user expects these batteries to operate without recharging for a reasonable length of time, such as to operate for a full 8-hour shift in a hospital. In order to achieve the expected battery life, the detector must support at least two power states: a standby, or low power state while awaiting commands from the user, and a high power state for image acquisition, during which all the power supplies to the detector are on. Similar power management is routinely implemented in handheld electronic devices, such as digital cameras and cell phones, for example. Without multiple power states, a portable DR detector can be expected to last less than 1 hour on battery power.

A number of detector requirements must be balanced against the need to conserve battery power. With respect to the present invention, the following are of particular interest: (1) battery life, a function of overall power consumption; (2) workflow requirements, with special emphasis on the need for readiness of the DR panel for patient imaging on user demand; and (3) image quality, suitable for medical diagnosis, with low levels of random or fixed pattern noise in the corrected images.

Figure 4:
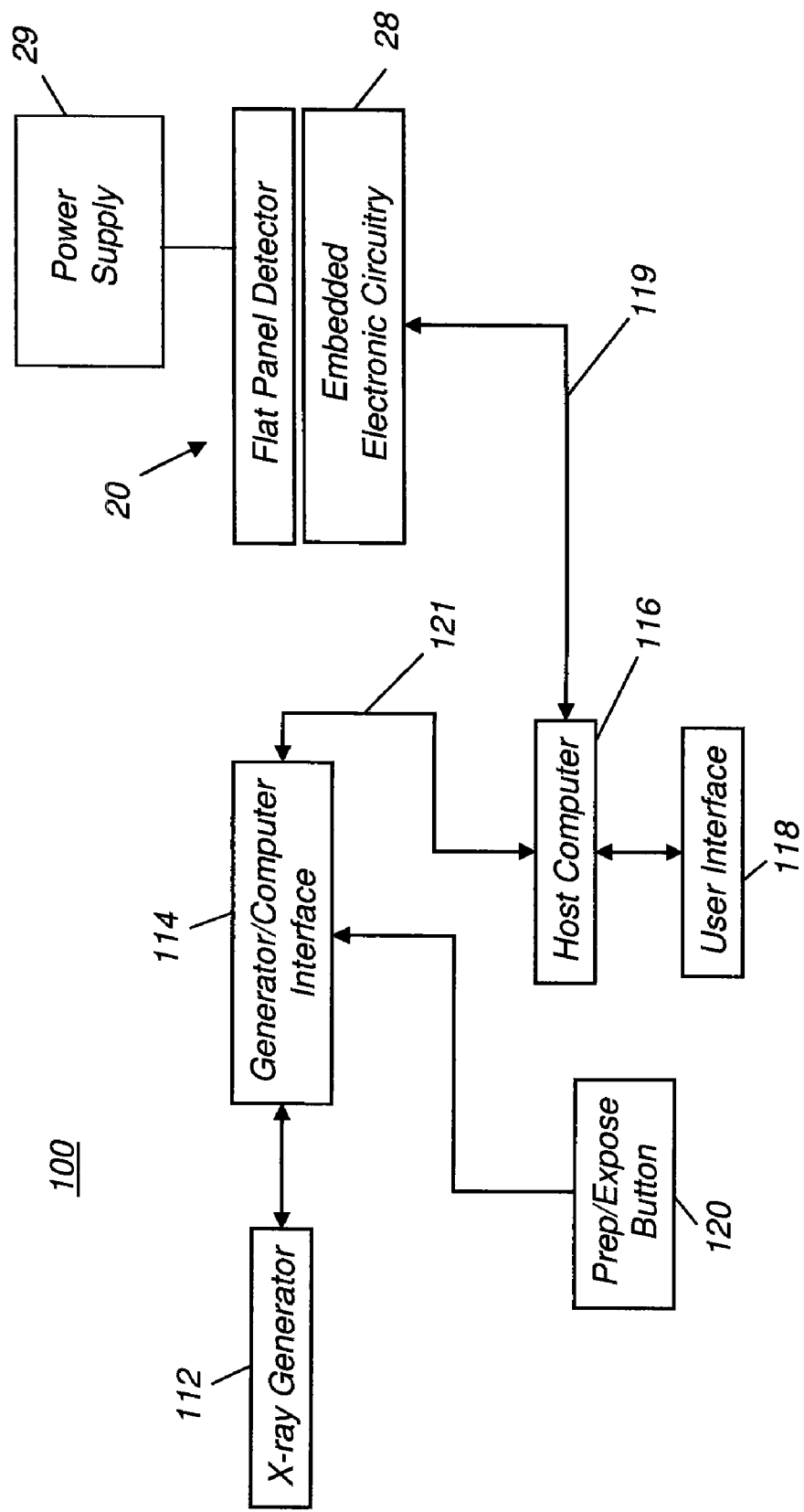
FIG. 4 is a block diagram showing a digital X-ray system including a flat panel detector according to a first embodiment of the invention.

For an appreciation of these requirements, it is useful to have an overview of some basic functional components of the DR system. The block diagram of FIG. 4 shows a digital radiographic system 100. A host computer 116 provides the control logic processor that manages all high-level functions of the system. This includes managing user interactions, communicating with peripheral devices, triggering X-ray exposures and image acquisitions, receiving images from flat panel detector 20, performing image processing and display functions, managing patient data, and other functions. Flat panel detector 20 has embedded electronic circuitry 28 (shown in more detail in FIG. 5) and is powered by a power supply 29, namely, a battery in the preferred embodiment. Host computer 116 communicates with flat panel detector 20 over a communication link 119 and controls an x-ray generator 112 by means of an interface 114 over a communication link 121. Standard means of communication used by the communication links 119, 121 can include wired Ethernet, USB, and wireless protocols, for example. A prep/expose control 120 provides operator instructions to initiate generator spin-up and exposure operations.

FIG. 4 shows prep/expose control 120 connected to interface box 114. Alternatively, prep/expose control 120 and or x-ray generator 112 can connect to host computer 116. The user enters patient data and other information and instructions to host computer 116 using a user interface 118.

At system startup, DR system 100 goes into Standby mode, ready to generate exposures. X-ray generator 112 is in Standby mode and parts of the embedded electronic circuitry 28 connected to the flat panel detector 10 are on. The power state of detector 20 at least supports standard communication functions with the host computer over communication link 119.

User interaction with this system to capture a patient image proceeds as follows in a preferred embodiment. When the Prep/Expose control 120 switch is pressed and held in the half-way position, the generator spins up the X-Ray tube rotor and brings the tube filaments to the correct temperature for exposure. Detector 20 then transitions from a "Standby" state to a "Ready" state, and signals to the host that it is ready to accept the exposure. When Prep/Expose control 120 is fully depressed, the signal is sent to host computer 116 that communicates with embedded circuitry 28 to verify that detector 20 is ready to accept an exposure. Embedded circuitry 28 delivers a "detector ready" signal to host computer 116 when detector 20 is ready to receive the x-ray signal. Host computer 116 passes the signal to generator 112 via interface box 114 and the X-ray beam is turned on.

Exposure terminates when an Automatic Exposure Control (AEC) or other control device asserts that the appropriate X-ray exposure has been delivered for a given type of patient examination. If a manual exposure technique is chosen, exposure terminates when the designated mAs setting has been reached.

Signal integration at detector 20 either terminates after the X-ray beam is off, or the integration period ends after a fixed time interval set on host computer 116 or stored in a register of embedded circuitry 28. In all cases, the integration period must be slightly longer than the exposure, so that detector 20 can fully accumulate the X-ray signal.

Figure 5:
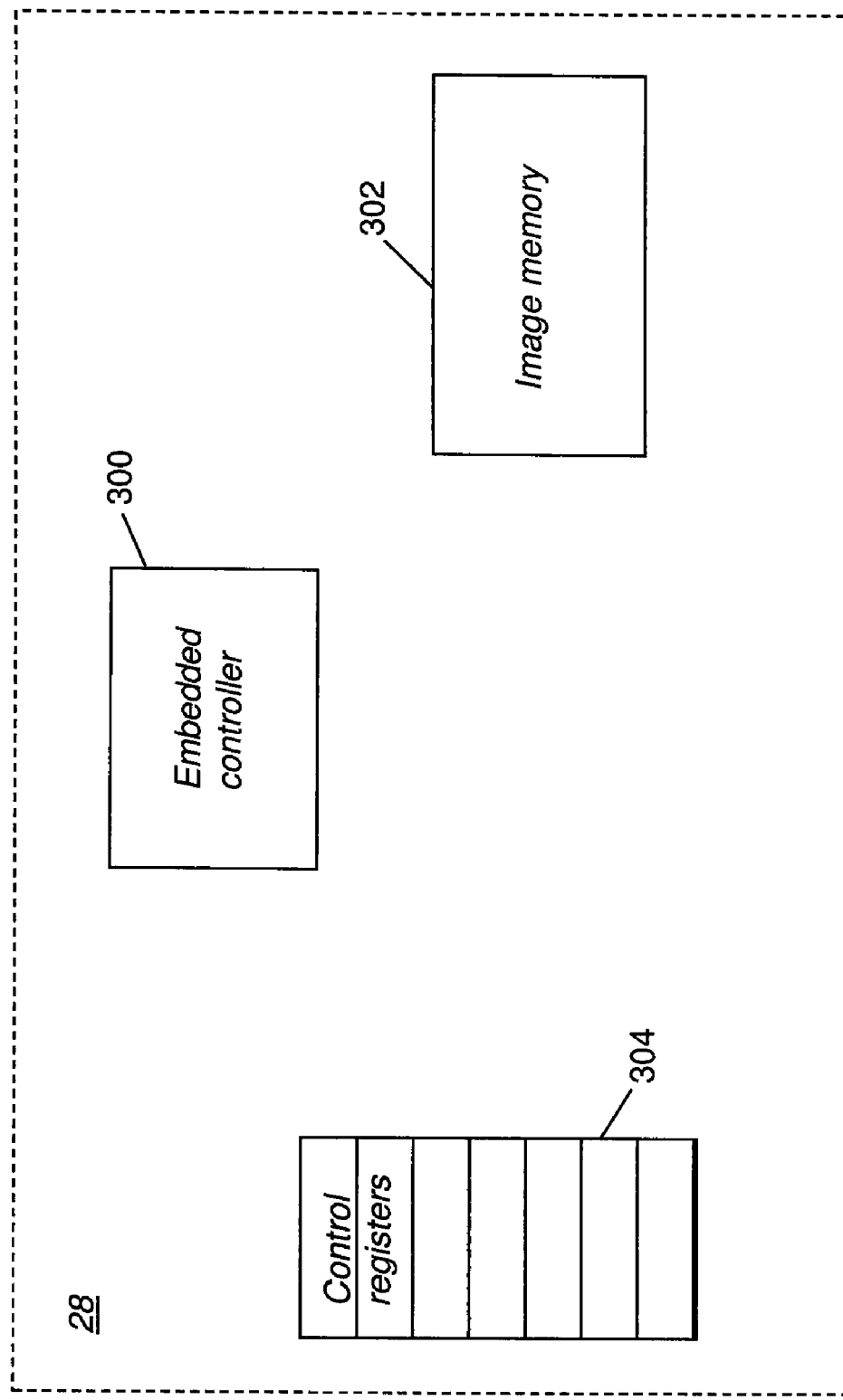
FIG. 5 is a block diagram showing the components of the embedded electronic circuitry of the detector of FIG. 4.

Detector 20 reads out the image, which may be temporarily stored in a memory 302 of embedded circuitry 28 (FIG. 5). Initial correction operations, such as offset and possibly gain and defect corrections, may be performed by embedded circuitry 28 before the image is sent to host computer 116 via standard communication link 119. Further image processing occurs at host computer 116. The full-size image and/or a sub-sampled preview image are then displayed to the user via the user interface 118. At the end of this process, detector 20 is ready to receive another x-ray exposure.

The following three terms refer to a typical sequence of operating the X-ray generator for the purpose of taking patient images:

Prep phase: Using a typical DR system, the operator starts the exposure sequence by entering a command or pressing the "Prep" button. During this Prep phase, generator 112 spins up and issues a signal to host computer 116 that it is ready to take the exposure. The prep phase interval, also referred to as prep time, may be extended by the operator beyond the Ready signal from generator 112 for certain imaging techniques or patients. For example, for imaging a small child, the operator may need to wait for an appropriate moment when the child is not moving. Thus, the prep time is also a random variable, although time periods between 2 and 15 seconds are common.

Expose: This stage begins when the operator issues the expose command to initiate the X-ray exposure. In most installations the Prep and Expose functions are implemented by prep/expose control 120 as a two-stage push button. In DR systems, it is essential that generator 112 not start the exposure until detector 20 signals that it is ready to start the integration phase and is, therefore, ready to record the X-ray exposure. Detector 20 may need to finish some refresh and prepare functions before the start of integration.

Beam On: During this phase the patient receives the exposing X-rays and the photodiodes on detector 20 integrate the light quanta emanating from its scintillator 14 (FIG. 1). The delay between the Expose command issued by the operator and the start of "Beam on" is referred to as "exposure delay." Short exposure delays, preferably, below 500 ms, are desirable.

Operation Sequence of DR Panels Supporting Multiple Power States

Operation of the panel is controlled by embedded electronic circuitry 28, which communicates with the host computer 116 via standard communication link 119. Referring to FIG. 5, the basic structure of embedded circuitry 28 is shown for one embodiment. Embedded circuitry 28 includes one or more of the following: embedded controller(s) 300, such as microprocessors, one or more FPGAs (Field Programmable Gate Arrays) or CPLDs (Complex Programmable Logic Devices), control registers 304, and image memory 302. The appropriate firmware executes the panel operating cycle and synchronizes the panel power states and operating cycle with external user events. Embedded circuitry 28 executes a repeatable sequence of operations on detector 20 in different power states. For example, when the panel is in high power state, embedded circuitry 28 may execute a repeatable sequence similar to that of a conventional tethered DR panel, with refresh and prepare, integration and readout functions (defined in more detail below). Moreover, embedded circuitry 28 manages power states, communication with host computer 116 to start and stop certain panel operations such as power-up or power-down, the start of integration, panel readout, temporary storage, and transmission of images.

Figure 6:
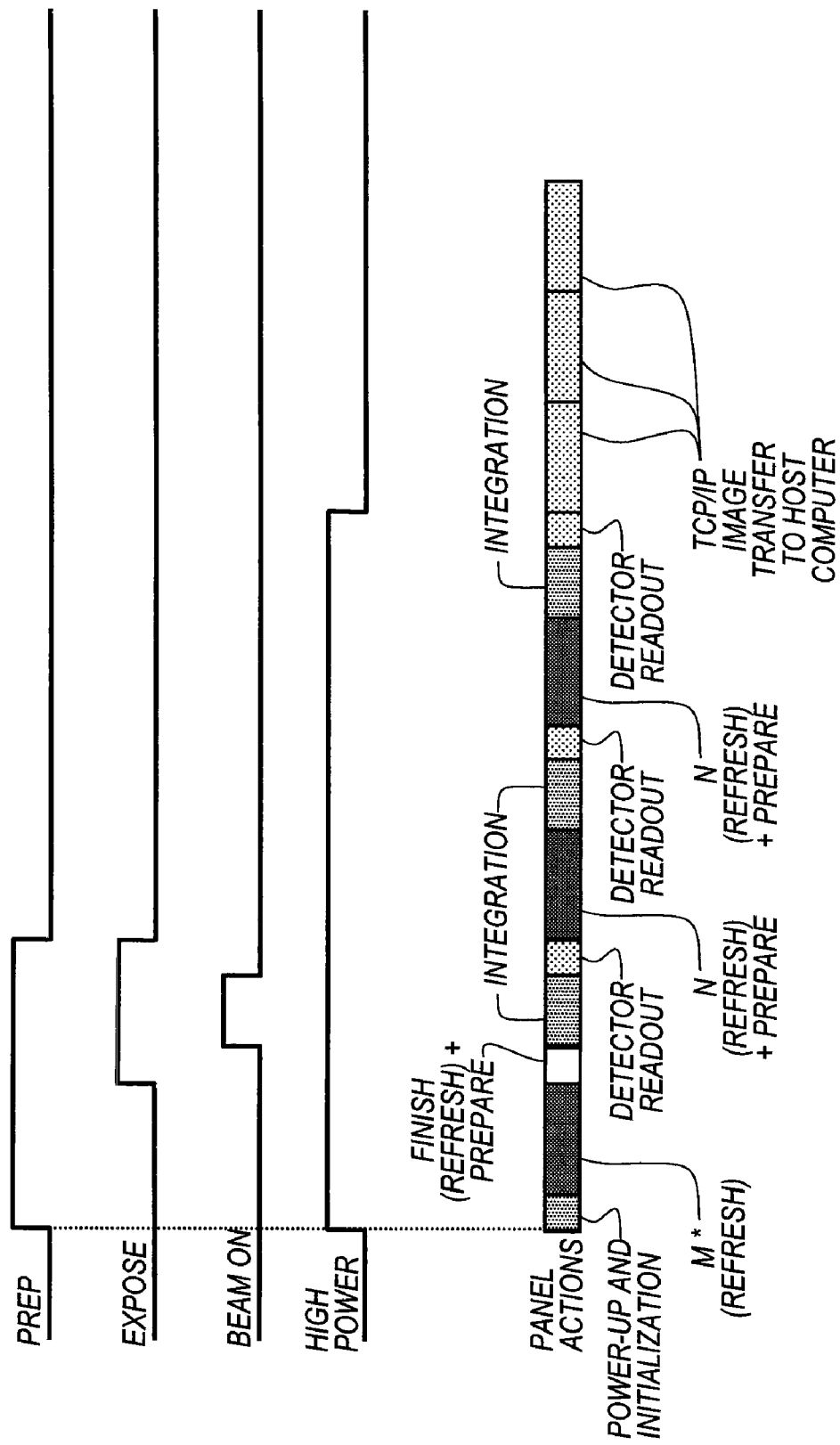
FIG. 6 is a timing diagram showing a full image capture cycle, including dark image captured, of a portable, battery-operated DR panel in an embodiment that uses two different power states.

FIGS. 6 and 7 show the timing for DR panel operation for obtaining a single patient image in two different embodiments. FIG. 6 shows an embodiment in which the DR panel has two power states, namely, Low and High power and FIG. 7 shows an embodiment with three power states, namely, Low, Medium, and High power.

For the embodiments in FIGS. 6 and 7, the power states of detector 10 are defined as follows:

Low power state: Power state in which nearly no voltage is supplied to the detector array, but embedded controller 300 is running and some communication functions are supported.

Medium power state: Power state in which some voltage is supplied to the detector array.

High power state: Power state in which all voltage is supplied to detector 20 and all readout electronics are active.

The embodiment shown in FIG. 6 has only the Low and High power states.

In the High power state, most DR detectors currently known in the art perform at least the following three basic functions (but additional functions may be available):

Refresh and prepare cycle: This is a sequence of detector operations that puts the detector into a repeatable state of operation at the beginning of each integration cycle. These cycles are necessary because of some of the fundamental properties of amorphous silicon (a-Si:H). One property relates to metastable states in the bandgap of the material that can trap electrical charge and affect electrical properties of the flat panel imager. One way to place the a-Si:H material into a reproducible state prior to each exposure is to use a backlight refresh panel that floods the flat panel imager with visible light in order to fill a large fraction of the trapping sites in the a-Si:H. In another embodiment, photodiode and TFT bias voltages in each pixel are switched in order to fill and empty the charge traps in a predictable fashion. More than one refresh cycle may be needed to achieve repeatable results. The prepare operation initializes the panel for readout.

Integration: The photodiode bias voltage (gate drivers) on each pixel is switched such that the photodiode or other photosensor component converts the incident light into electrical charge, which is stored in the internal capacitance of the pixel element.

Readout: The readout of the image information is performed by peripheral electronic circuitry of readout elements 25 (FIG. 1) that connect to the edge of the a-Si:H array. The charge readout from each individual pixel is converted to a digital value in the analog to digital converter (ADC) that is part of the readout circuitry.

Referring to the embodiment of FIG. 6, in which detector 20 supports two power states, detector 20 is in low power state while not taking images; only external communication functions are on. When the generator Prep switch is pressed, detector 20 transitions from low to high power state. The detector is ready for the exposure within a short time period, preferably below 2 seconds, after activating the Prep switch. During this period, all power to detector 20 is switched on. One or more refresh cycles and a prepare cycle are executed; the exact number varies on an image-by-image basis because of variations in the duration of the Prep phase. After the Expose switch is activated by the operator, detector 20 finishes the current refresh and prepare cycle, starts the integration period, and signals to generator 112 to turn the X-ray beam on. The "Beam On" period must fully fall into the integration period, such that all X-rays exposing the patient are integrated by the panel.

At the end of integration, embedded electronic circuitry 28 initiates the image readout to temporary storage in memory 302 (FIG. 5). In the embodiment shown in FIG. 6, the detector 20 remains in high power state and takes two dark images after the exposure. These three captures in total, without power transition, are referred to as an "image acquisition in multi-capture mode." Before taking each of the post-dark images the detector runs through at least one, but possibly more, refresh cycles. At the end of last readout the detector returns to the low power state and images are then transmitted to host computer 116 via standard communication link 119 (TCP/IP image transfer in the example in FIG. 6). Finally, detector 20 is ready for the next image acquisition.

Capturing the dark images for offset correction after the exposure instead of capturing so-called pre-dark images can be advantageous in terms of workflow. Detector 20 is ready to enter the Prep phase immediately on interaction with the console on host computer 116, and the exposure can be taken within a short period after activating the Prep switch. The time to display of the final corrected and processed image can be shortened, and power consumption can be reduced, by capturing a single post-dark image. These advantages have to be carefully balanced against somewhat higher image noise, which tends to lower image quality. Of course, it is also possible to take more than two dark images in order to further reduce the impact of electronic noise on image quality.

FIG. 7 shows an embodiment based on the concept of a study in which multiple images are obtained for a single patient. This embodiment includes a Medium power state, which is the default power state during the study time period. As in the embodiment of FIG. 6, detector 20 is in low power state between studies. When the user interacts with the console to start a new study and enters patient data, the "Begin Study" command is sent to embedded circuitry 28. Detector 20 transitions from Low to Medium power state, that is, some detector voltages, as determined by the firmware, are switched on. This type of workflow may allow the capture of a limited number of pre-exposure dark images while the operator enters patient data. The detector remains in Medium power state during the generator Prep phase. In this scenario the time intervals between the Begin Study and the Prep command, as well as the duration of the prep phase, are variable.

With the FIG. 7 embodiment, when the Expose button is pressed, the detector transitions from Medium to High power state. All power supplies are stabilized and embedded circuitry 28 executes at least one, but possibly more refresh cycles and a prepare cycle. These cause an exposure delay of about 500 ms. Finally, detector 10 starts the integration period and signals to generator 112 to turn the X-ray beam on. All operations in High power state from this point forward are similar to those shown in FIG. 6, except that the preferred number of refresh cycles between images in High power state may be different where there are three power states. At the end of the last image readout, the detector returns to Medium power state. All three images captured in multi-capture mode are then transmitted to host computer 116 via communication link 119. Detector 20 remains in the Medium power state until either the next Expose signal is received and the image capture cycle repeats or until the "End Study" command is issued, which causes a transition back to the Low power state.

Figure 2:
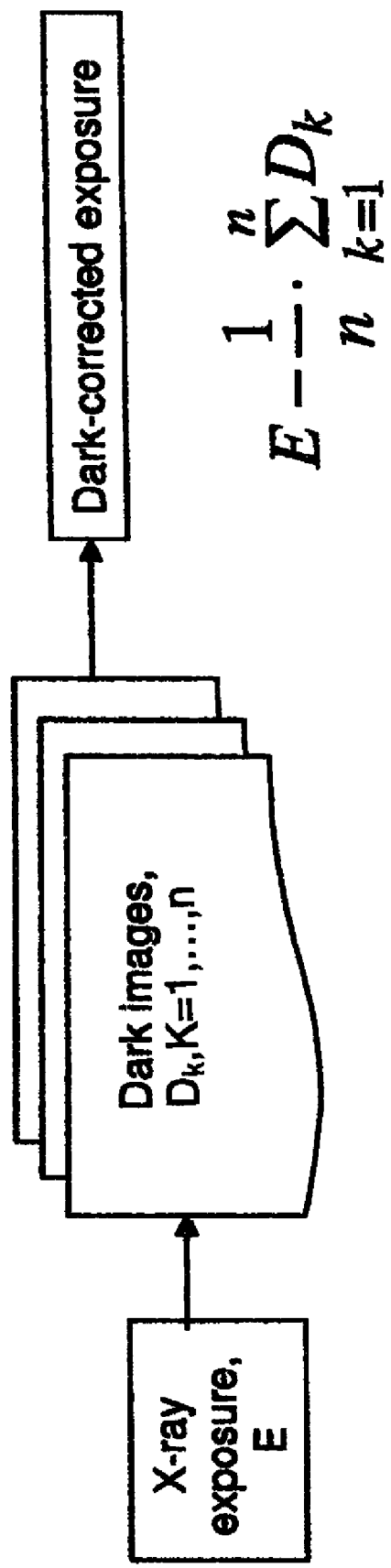
FIG. 2 is a block diagram showing a conventional sequence for obtaining dark images for correcting an exposure image.
Figure 3:
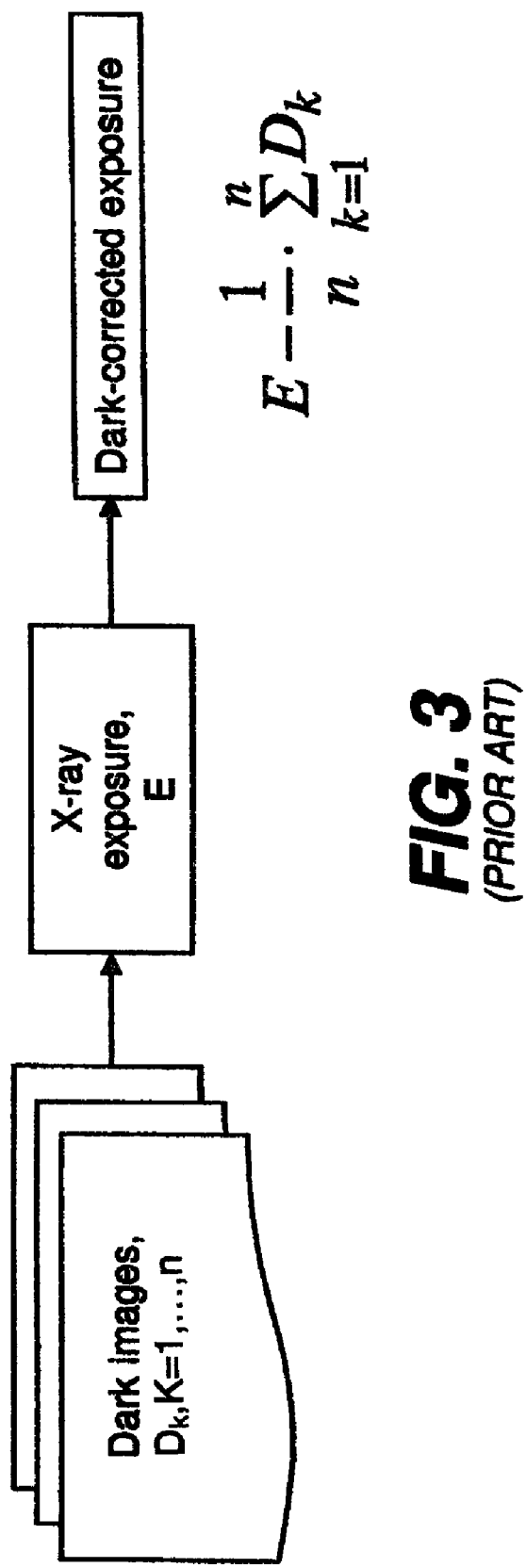
FIG. 3 is a block diagram showing an alternate conventional sequence for obtaining dark images for correcting an exposure image.

Several elements of the timing sequences illustrated in FIGS. 6 and 7, as well as the physical environment in which a portable, battery powered DR flat panel detector is used, with its potential changes in ambient temperature, result in incomplete offset corrections if the standard methods shown in FIGS. 2 and 3 are used. FIGS. 6 and 7 show that the number of refresh cycles executed before the exposure may differ from the optimum number for the post-dark images. For the embodiment shown in FIG. 6, variations in prep time translate to variations of the time the panel spends in High power state for each capture. In the embodiment shown in FIG. 7, the panel spends the same amount of time in the High power state during each multi-capture image acquisition. However, the time in Medium power between the multi-capture sequences is variable. As a result, the global and local heating profiles and charge distributions may differ between the exposure and the post-dark images, depending on the timing of the various power states.

In general, there appear to be differences between the dark image corresponding to the exposure, that is, the dark image that needs to be subtracted from the exposure for full offset correction and the best image quality, and pre- or post-dark images that are available to perform the offset correction. However, it is possible to characterize and correct these systematic differences as a function of common user and environmental parameters, which are referred to herein as "user and image metadata." User metadata 30 generally relates to timing and event control exercised by the operator. Common examples of user metadata include operator-controlled variables, such as prep time, and time between multi-capture image sets in a study. Image metadata 32, on the other hand, generally includes variables outside of direct operator control, such as ambient temperature, data from temperature sensors inside the panel, and the mean or median of a dark capture which was previously characterized as a function of temperature. Metadata may also include a detector identification that identifies to the host computer the detector that is providing information. This is particularly useful when numerous detectors communicate with a single host computer.

In embodiments of the present invention, detector 20 can be programmed to replicate the timing of possible sequences of user events. Embedded circuitry 28 triggers Begin Study, Prep, Expose and power switching commands based on its control register 304 settings (FIG. 5), which can be programmed from the host computer 116. The X-ray exposure of a corresponding sequence triggered by the user is replaced by a dark capture triggered by embedded circuitry 28. The post-dark captures are automatically triggered by embedded circuitry 28 even in the real patient image captures. In the example corresponding to FIG. 6, embedded circuitry 28 may trigger the Prep command and cause detector 20 to transition to the High power state. A control register 304 setting instructs embedded controller 300 to delay the Expose signal by a given amount of time. This delay corresponds to the prep time in patient image captures. The similarity between the X-ray captures of patients triggered by the user and the same timing sequence with dark images triggered by embedded circuitry 28 is illustrated in FIGS. 8A and 8B.

Thus, for example, where three dark images 44 are captured, the systematic differences between the first dark image 1 and the average of the second and third dark images can be characterized and stored as a function of user and image metadata. The "offset adjustment map" is the image representing these systematic differences for a pre-selected combination of exposure and user metadata that represent actual imaging conditions.

In FIG. 8A, one or more user (operator) events generate user metadata 30. User metadata 30 relates to timing and event control exercised by the operator. Image Exposure metadata 32 then relates to ambient conditions such as temperature data and mode timing for power mode settings. A number n of dark images 44 ($D_k$, k=1, ..., n) are obtained and are averaged. The averaged value is subtracted from the exposure, forming a dark-corrected exposure 50, in a manner similar to that described earlier with reference to FIG. 3.

FIG. 8B shows an offset adjustment map 60 formed for use as described below. The adjustment map 60 is formed by obtaining a single dark image 54 with accompanying image metadata 32 and user metadata 52. A number of dark images 44 are then obtained and averaged. This averaged value is subtracted from values for dark image 54 in order to provide offset adjustment map 60. The acts of averaging, adding, subtracting, multiplying, dividing and otherwise manipulating images described generally are known in the art. Although such functions generally are performed on a per-pixel basis, such is not required. Those of ordinary skill in the art will recognize other methods of manipulating images in the manners described herein.

Figure 9:
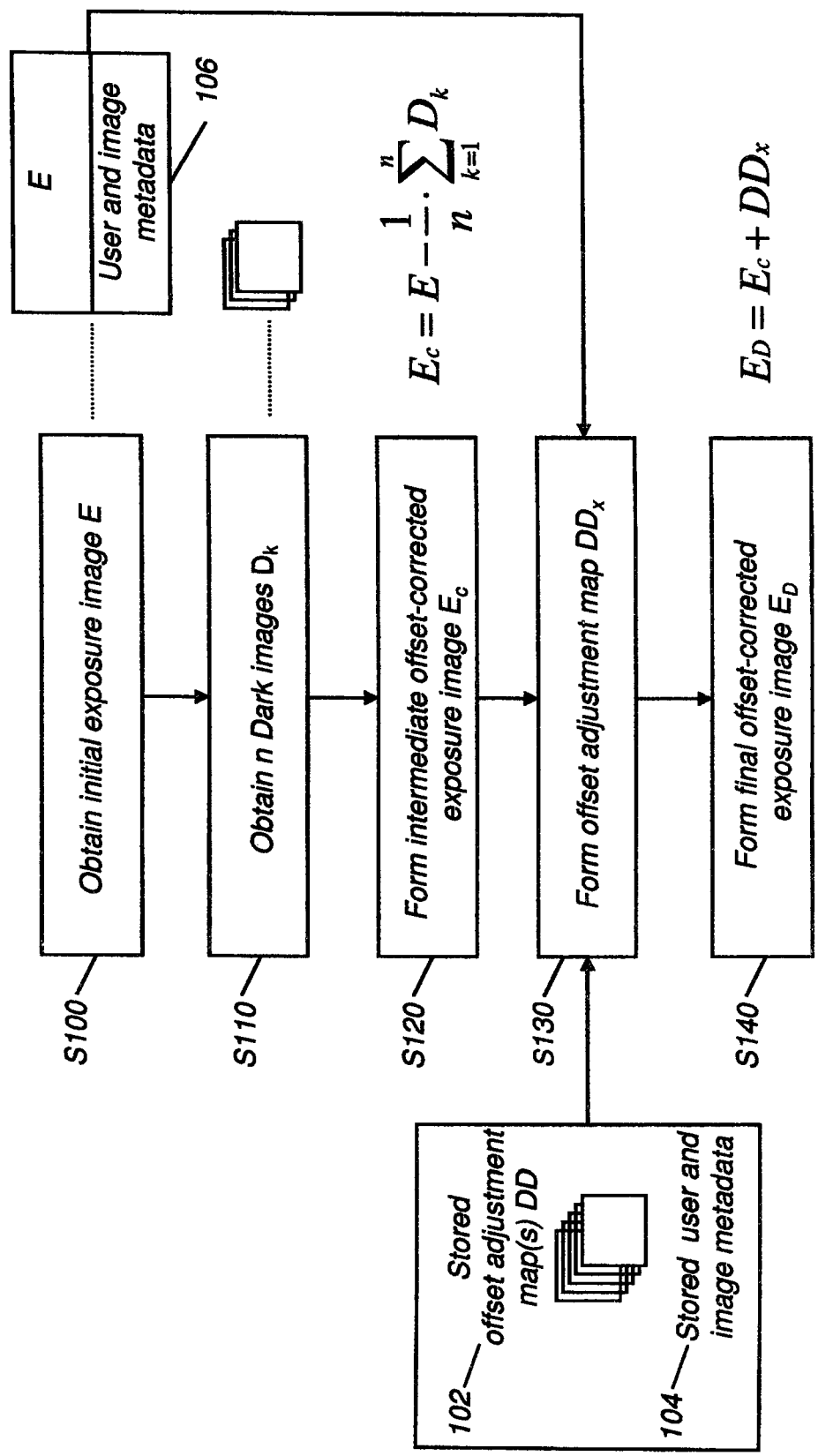
FIG. 9 is a logic flow diagram that shows a sequence for using post-exposure dark images and stored offset adjustment maps to generate an offset-corrected exposure image according to a preferred embodiment of the invention.

The logic flow diagram of FIG. 9 shows basic steps used for offset correction according to the present invention. A step S100 obtains an initial exposure image E and corresponding exposure metadata, e.g., user and image metadata 106, about capture conditions under which image E is captured. One or more dark images $D_k$ are then obtained in a step S110. Some or all of the dark images may be obtained before or after the exposure image E obtained in step S100. In a step S120, an intermediate offset-corrected exposure image $E_c$ is formed by averaging the dark image readings and subtracting them from the exposure image E data.

Still referring to FIG. 9, a step S130 then obtains an offset adjustment map, abbreviated $DD_x$ (for "Dark Difference") from a set of stored offset adjustment maps 102 and corresponding stored metadata 104. The offset adjustment maps 102 and the stored metdata 104 will be described in more detail below. In a step S140, the final offset-corrected exposure image $E_D$ is formed by combining the intermediate corrected exposure image $E_c$ with the selected offset adjustment map. For example, both images may be added together.

Step S140 marks the end of the offset correction procedure. Subsequently, other common image correction steps may be performed, e.g., gain and defective pixel corrections, as described, for example by Wischmann, Moy and Bosset and Seibert, Boone and Lindfors. Commonly the corrected images are also rendered for softcopy display or hardcopy prints as described by Isaac A Ajewole and Ralph Schaetzing in U.S. Pat. No. 5,046,118 entitled "Tone-scale generation method and apparatus for digital x-ray images" by Mary E. Couwenhoven, Robert A. Senn and David H. Foos in "Enhancement method that provides direct and independent control of fundamental attributes of image quality for radiographic imagery," Proc. SPIE Vol. 5367, 2004, p. 474-481.

Figure 10:
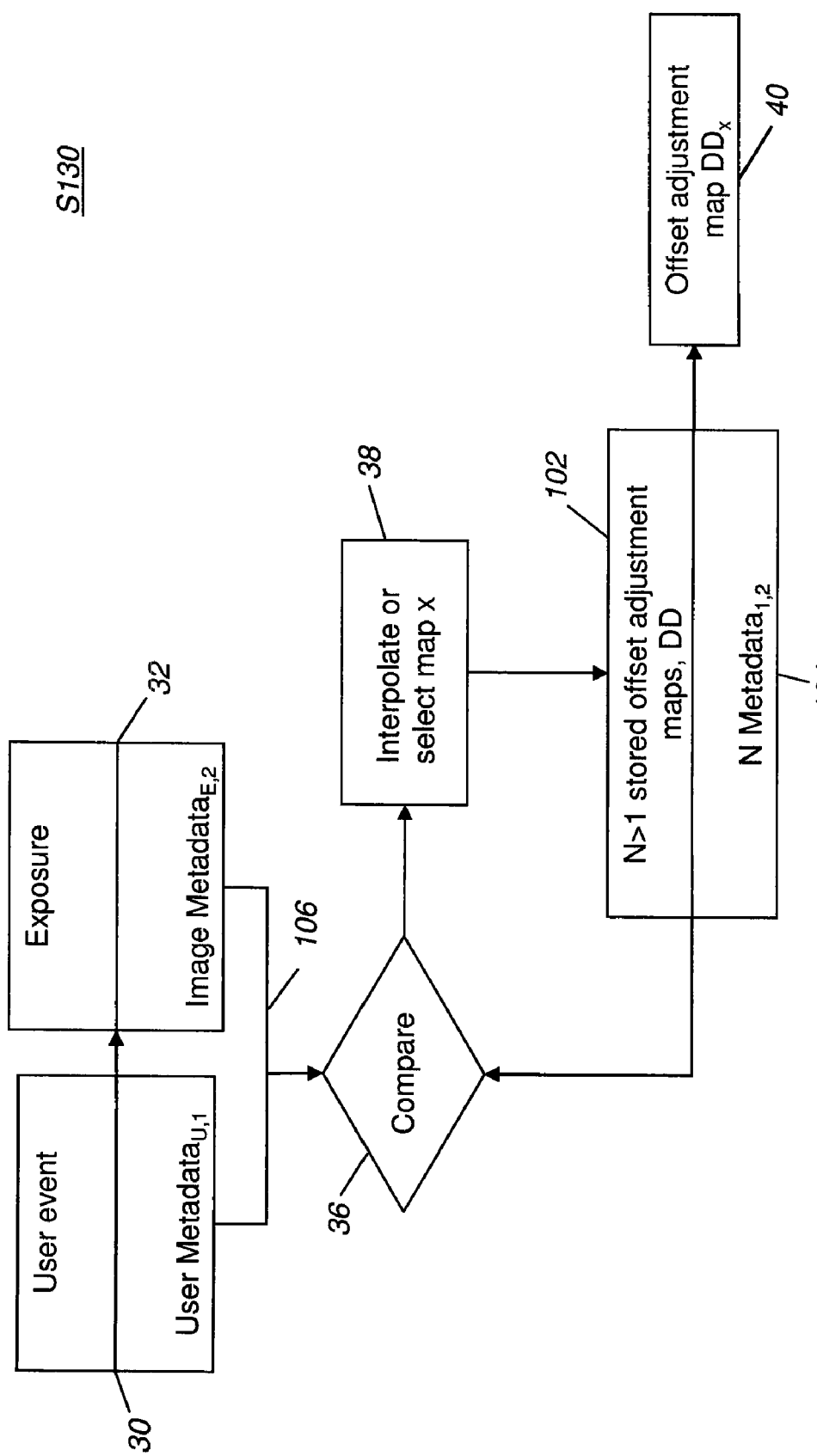
FIG. 10 is a logic flow diagram showing how an offset adjustment map is formed in one embodiment.
Figure 11:
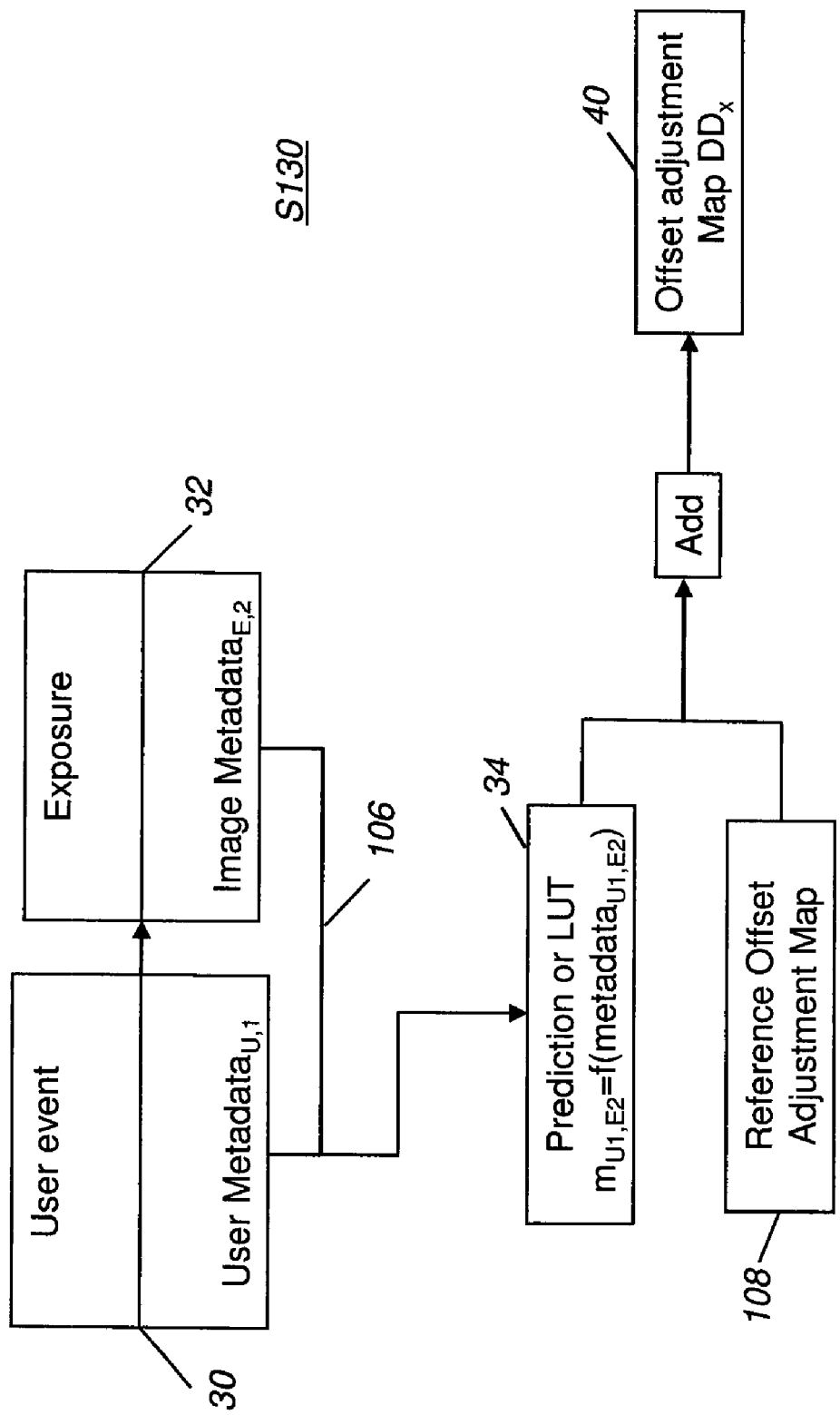
FIG. 11 is a logic flow diagram showing an alternate sequence for generating an offset adjustment map.

FIGS. 10 and 11 are illustrations showing embodiments of how the offset adjustment map $DD_x$ chosen in step S130 of FIG. 9 is formed. Referring first to FIG. 10, two types of metadata 106, namely user metadata 30 and image metadata 32 as described above in connection with FIG. 8A, are used to help with the selection of the appropriate offset adjustment map $DD_x$ for correcting the x-ray exposure image. The user metadata 30 is associated with a user event and the image metadata 32 is associated with the exposure, as described above.

A set of stored offset adjustment maps DD.sub.x 102, formed from previously captured dark images using the process generally described with reference to FIG. 8B, is indexed in a memory or storage device according to associated stored user metadata and/or image metadata 104. The generation of these maps in a factory calibration step and possible updates using a calibration procedure carried out at certain predetermined intervals is explained later with reference to FIGS. 16, 17, 19 and 20. When an exposure is obtained (step S100 in FIG. 9), the accompanying user and image metadata 30, 32 (combined into metadata 106) corresponding to the exposure are recorded. This recorded metadata 106 is compared to the metadata 104 corresponding to the stored offset adjustment maps 102 in a comparison step 36. The selected offset adjustment map, DD.sub.x, is then formed from the stored set of offset adjustment maps 102 by a selection or interpolation process 38, described in more detail with reference to FIGS. 12 and 13.

Figure 21:
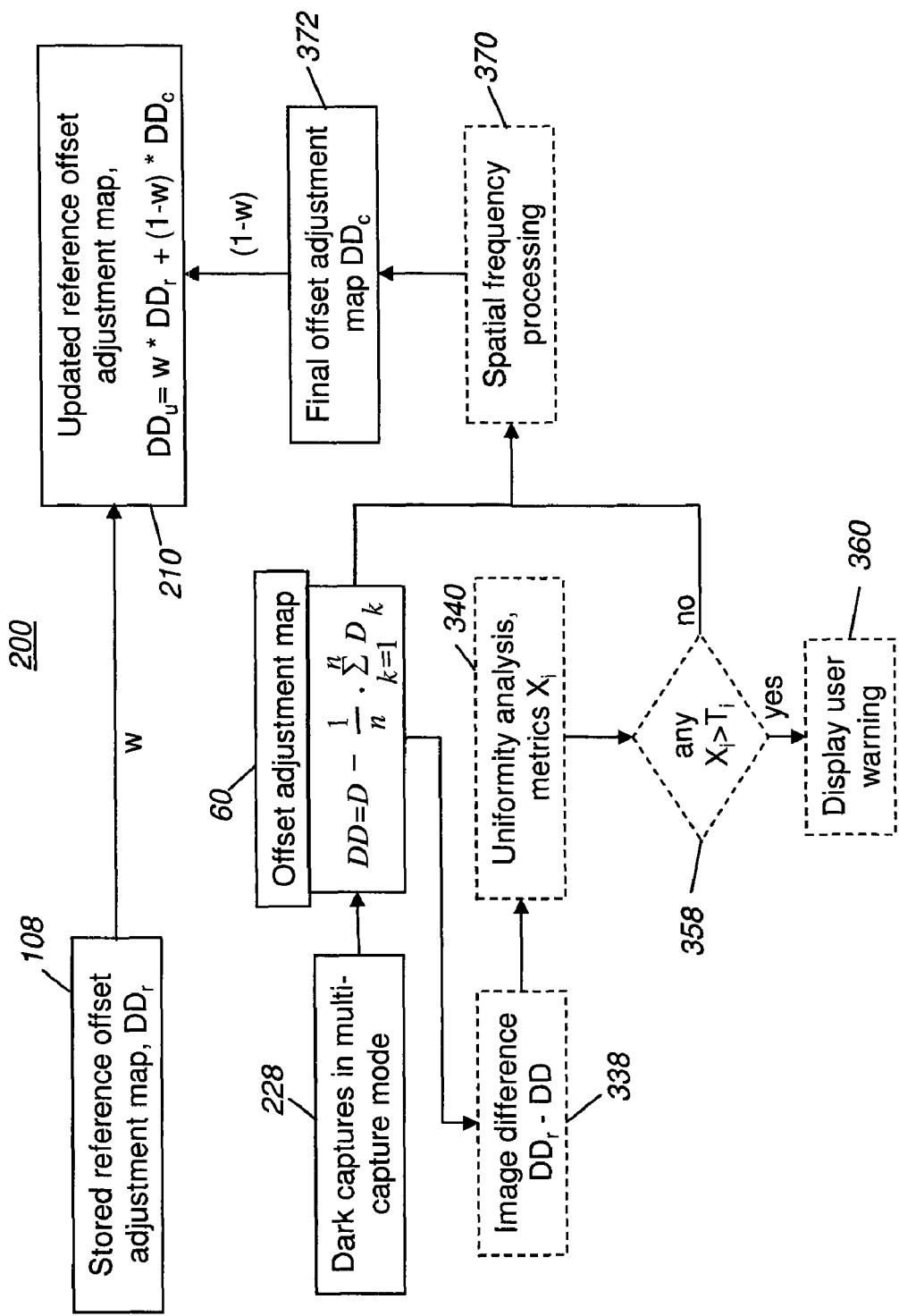
FIG. 21 shows an update function for a reference offset adjustment map.

The logic flow diagram of FIG. 11 shows a sequence to select a stored offset adjustment map in an alternate embodiment. In this case, a single reference offset adjustment map DD 108, generated as described below in connection with FIGS. 17 and 18 and updated as shown in FIG. 21, is stored. This map characterizes the two-dimensional pattern required for the additional offset correction (S130), which is, in this case, independent of metadata. However, some statistical measure, for example the image mean, of the required offset adjustment map varies as a function of the user and image metadata 30, 32. This functional form 34, which can also be implemented as a one- or multi-dimensional lookup table (LUT) is again characterized using the procedures shown in FIGS. 14 and 15, and the parameters for the function are stored. In the following example the mean, m, of the offset adjustment map is an exponential function of the Prep time, t:

$$m = x_1 + x_2 \cdot (1 - \exp(-x_3 \cdot t)) \tag{1}$$

The parameters $x_1$ to $x_3$ are stored, and the stored reference offset adjustment map 108 has a zero mean and a known offset (for storage in 16 bit integer format) that is subtracted before adding the mean calculated according to Equation 1. Thus the offset adjustment map 40 formed in step S130 is calculated by adding the stored reference offset adjustment map 108 (shifted to zero mean) and the predicted mean shift functional form 34 calculated inserting metadata 106 of the current exposure into Equation (1). The functional form 34 can of course depend on user and/or exposure metadata 30, 32. For higher computational efficiency, equation 34 can be encoded and applied as a single- or multi-dimensional lookup table (LUT).

Figure 12:
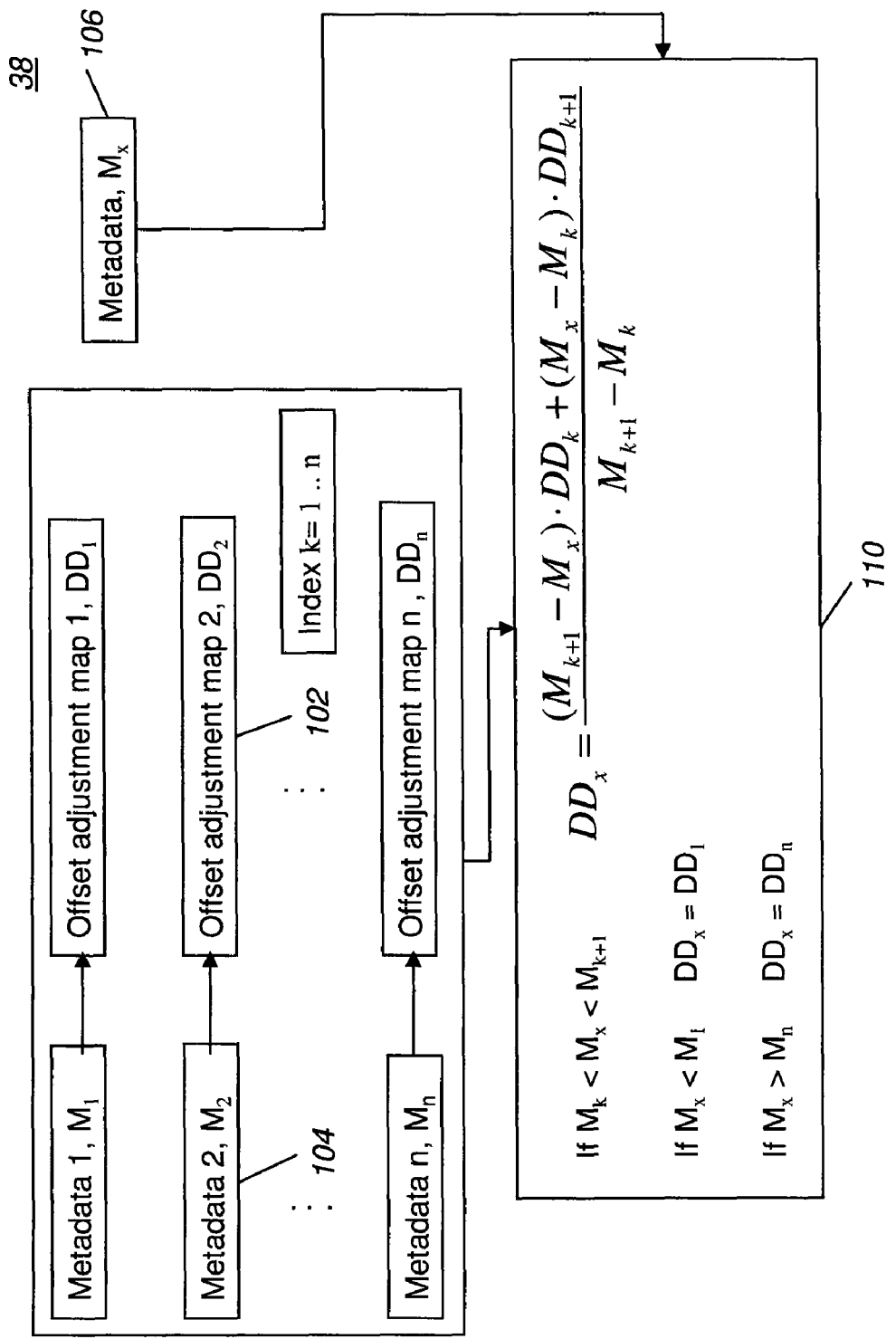
FIG. 12 is a block diagram illustrating the use of metadata to interpolate an offset adjustment map from a set of stored offset adjustment maps with metadata.
Figure 13:
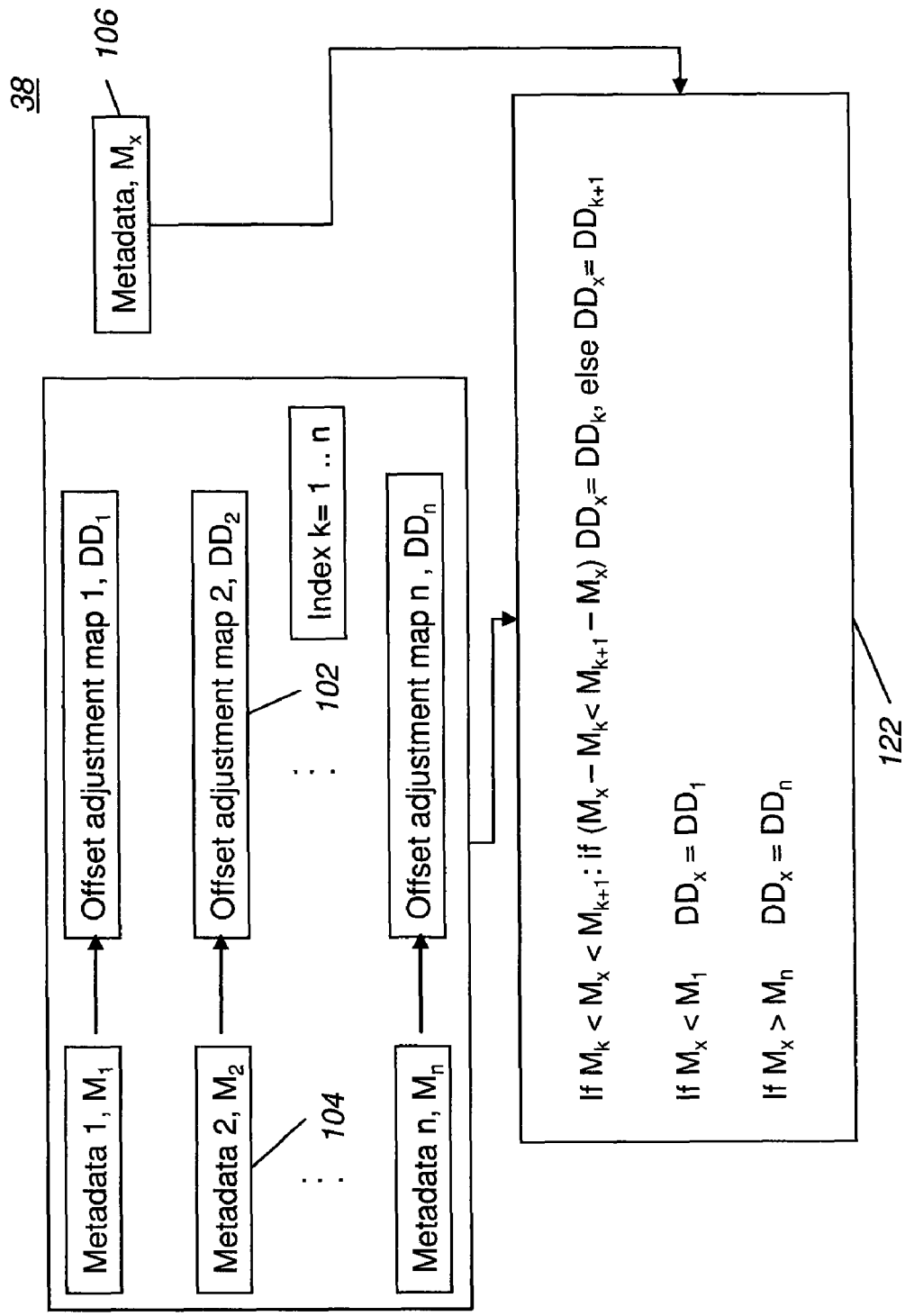
FIG. 13 is a block diagram illustrating the use of metadata to select the offset adjustment map from a set of stored offset adjustment maps with metadata.

A selection or interpolation process 38 is shown in more detail in FIGS. 12 and 13. In the embodiment of FIG. 12, interpolation is used to form the offset adjustment map 40. FIG. 12 shows n sets of stored metadata 104 ($M_1$-$M_n$) and the corresponding offset adjustment maps 102, which were generated according to FIG. 8B and will be described subsequently with respect to FIGS. 14 and 15. The metadata 106 of the current exposure is compared with the sets of stored metadata 104. If metadata 106 falls between two stored sets with indices k and k+1, linear interpolation between code values in the offset adjustment maps $DD_k$ and $DD_{k+1}$ is performed according to the equation shown in interpolation routine 110. If metadata 106 falls outside the range of stored metadata 104, as characterized previously, the offset adjustment maps $DD_1$ or $DD_n$ are selected. Likewise, an extrapolation method could be devised for any metadata 106 that falls outside the previously characterized range. Interpolation methods in conjunction with metadata have been used previously for gain maps, mainly for three-dimensional imaging, but have not been used for offset maps (see Schmidgunst C, Ritter D, and Lang E., "Calibration model of a dual gain flat panel detector for 2D and 3D x-ray imaging," *Med Phys.* 34 (2007), 3649-64; Stefan Maschauer, Dieter Ritter, and Christian Schmidtgunst, "Method for correcting an image data set," and U.S. Patent application No. 2007/0065038 A1 entitled "Method for generating an image data set, and method for generating an image corrected thereby," by Maschauer.

The selection method shown for offset adjustment map 40 in FIG. 13 is similar to that in FIG. 12, but without interpolation. The offset adjustment maps 102 are stored in sufficiently small increments of metadata, such that if the metadata 106 falls between stored metadata 104 with indices k and k+1, the set that has the smallest absolute difference relative to metadata 106 is selected according to selection routine 122. For example, if the metadata for the current exposure 106 is closer to the stored metadata for set k than for set k+1, the offset adjustment map $DD_k$ is selected. In any of these methods, any or all types of metadata may be used to determine the appropriate offset adjustment map.

Generation of the Initial Set of Offset Adjustment Maps in a Characterization Step The offset adjustment maps first introduced in FIG. 8B can be initially generated for a particular DR flat panel detector at the time of manufacture in a factory calibration procedure. A collection of dark image sets is acquired in multi-capture mode, each anticipating particular conditions that could be encountered when the DR panel is in use with the purpose of generating the offset adjustment maps 102.

Figure 14:
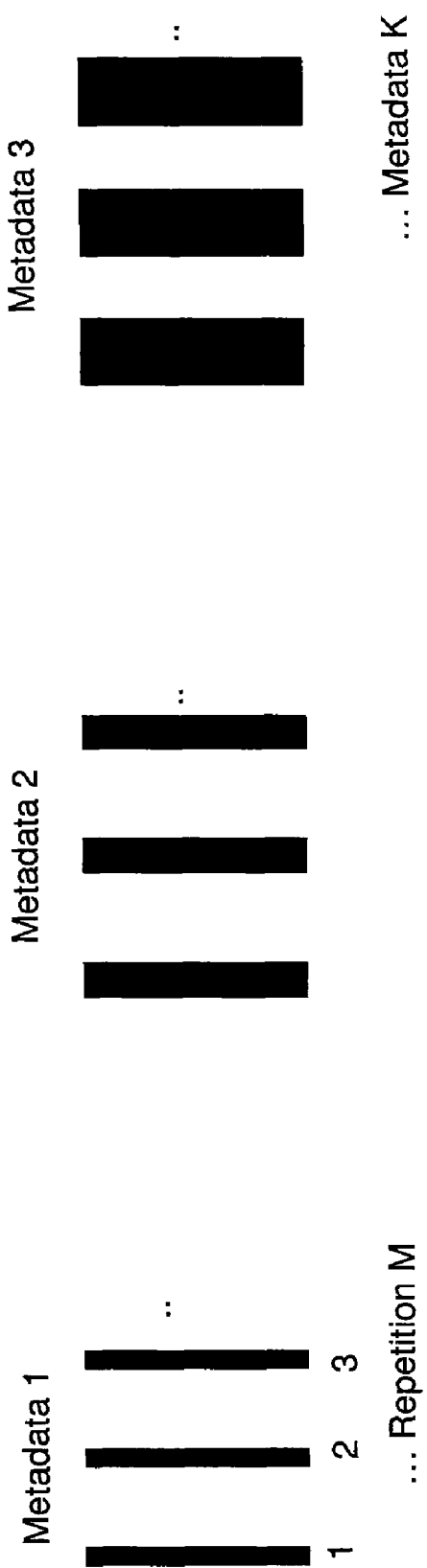
FIG. 14 shows an example of a characterization timing sequence with two power states for forming offset adjustment maps, where the time spent in high power state is varied.
Figure 15:
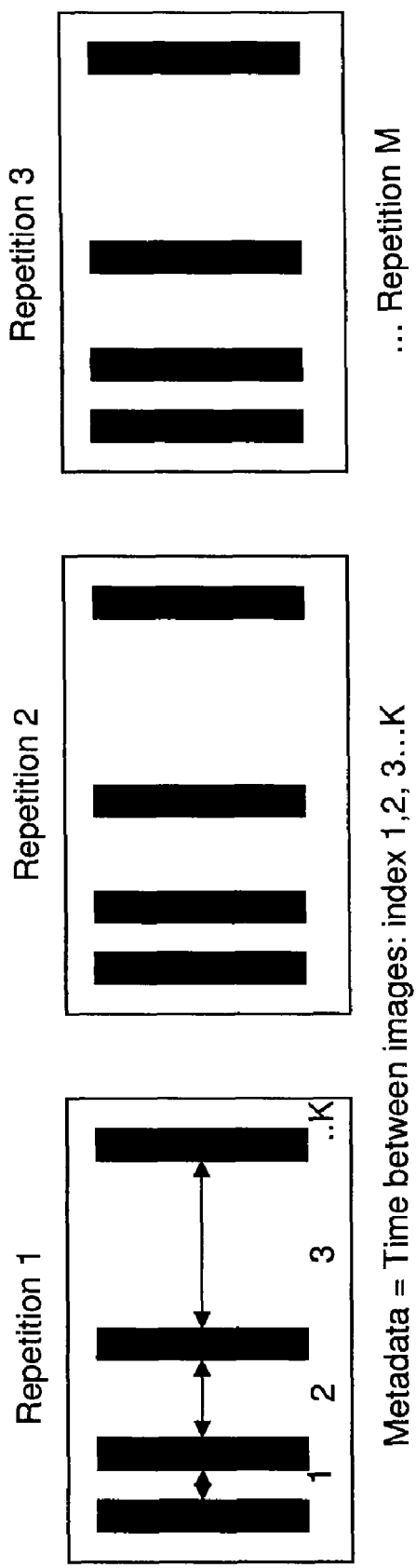
FIG. 15 shows an example of a characterization timing sequence with two or three power states for forming offset adjustment maps, where the time between images within a study varies.

FIGS. 14 and 15 show two embodiments of the characterization sequence. In the sequence shown in FIG. 14 the panel supports two different power states, similar to the embodiment of FIG. 6 and the panel is in High power state during the Prep phase of the generator. The user variable modified in the characterization sequence is prep time, which has K different settings. The number n relates to the number of dark images that are to be obtained per exposure. The width of the black rectangles in FIG. 14 represents the time the panel spends in High power state in each individual characterization event. The following sequence is used for generating a set of K offset adjustment maps:

(i) Operate in a Low power state for a fixed time period;

(ii) Switch to a High power state and capture a set of n+1 dark images in multi-capture mode (for a definition of variable n see FIGS. 8A and 8B and the accompanying descriptions), where dark image 1 is captured with a specific prep time;

(iii) Optionally loop between steps (i) and (ii) for M>1 repetitions in order to reduce any electronic noise built into the offset adjustment maps; and (iv) loop between steps (i) and (iii) to obtain dark image sets at K different prep times.

Each set of dark images acquired in multi-capture mode is averaged and processed as shown in FIG. 14 to form a set of K factory offset adjustment maps 102, DD.sub.k. The corresponding metadata 104 is stored with the maps. As Shown in FIG. 14 and FIG. 15, for example, DD.sub.k can be represented by $$DD_k = \frac{1}{M} \sum_{m=1}^{M} \left( D_{k,m} - \frac{1}{n} \cdot \sum_{j=1}^{n} D_{k,m,j} \right),$$

as described herein.

In the embodiment shown in FIG. 15, the metadata of interest is the time between images within a study, ranging from 1 to K, over a series of M repetitions. In this embodiment, the DR detector panel may support two or three power states according to the embodiments described in connection with FIGS. 6 and 7. The offset adjustment map $DD_k$ 60 is again obtained by averaging the M repetitions for each interval of time between images k=1 ... K.

Figure 16:
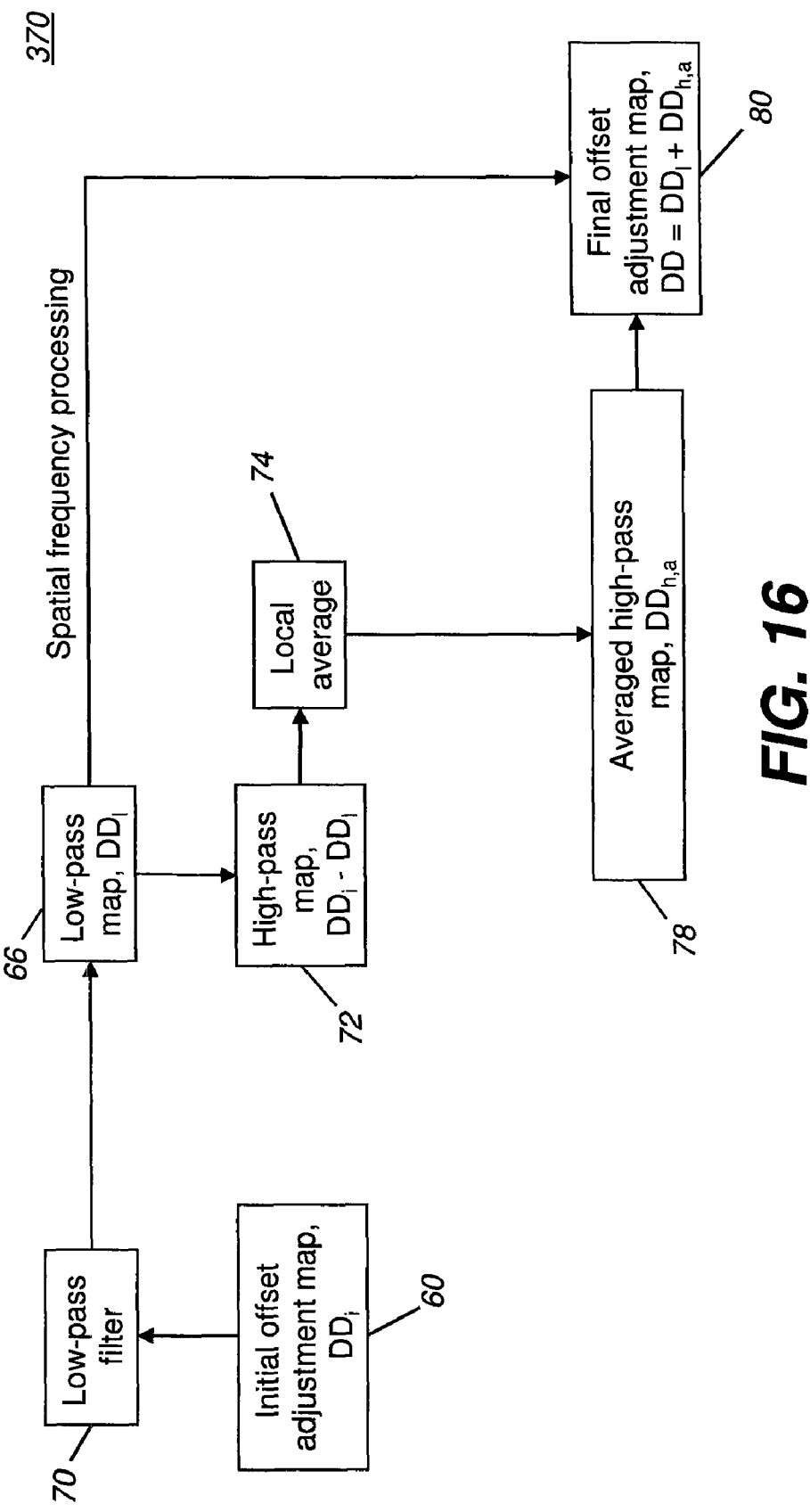
FIG. 16 shows a sequence for forming an offset adjustment map using a frequency decomposition technique.

The examples in FIGS. 14 and 15 show embodiments in which multiple sets of dark images are captured under identical conditions and averaged. For some implementations this procedure may be too time-consuming. The block diagram of FIG. 16 shows an alternative method 370 of obtaining offset adjustment maps without executing several repetitions at a given metadata setting k. Instead, a single set of dark images, or a small number of sets, is acquired in multi-capture mode. Frequency decomposition methods are employed, providing high and low frequency maps, to reduce the noise built into the offset adjustment map, and thus the noise of the offset-corrected image. Suitable filtering methods, for example, include two-dimensional median filtering, and filtering schemes such as those proposed for more efficient noise reduction by Gindele in U.S. Pat. No. 6,937,772 entitled "Multiresolution based method for removing noise from digital images." Smoothing operations can also be performed on the high and low frequency maps, using image smoothing techniques familiar to those skilled in the image processing arts.

In FIG. 16, an initial offset adjustment map $DD_i$ 60 is obtained according to the process illustrated by FIG. 8B and is processed using a low pass filter 70. This forms a low-pass map $DD_l$ 66. A high-pass map 72 is generated by subtracting the low-pass result from initial offset adjustment map $DD_i$. The noise in the high-pass image is reduced by calculating a local average 74, such as the image mean on a column by column basis, for example, and replicating the result across all rows to form a full-size two-dimensional image, resulting in an averaged high-pass offset adjustment map $DD_{h,a}$ 78. A final offset adjustment map DD 80 is then formed by combining low-pass filtered map 66 with averaged high-pass offset adjustment map 78.

In one embodiment, the set of offset adjustment maps and corresponding metadata generated according to FIG. 14 can simply be stored for future use in image correction step S130 as shown in FIG. 9. This straightforward procedure would be most appropriate if the offset adjustment maps were invariant over time. However, just as gain maps change when the DR detector panel ages (as described in International Application Publication No. WO2007/110798 A1 entitled "Temperature Artifact Correction" WO2007/110798 A1 by Luijendijk, Johannes A., Steinhauser, Heidrun, and Menser, Bernd) it is expected that offset adjustment maps also change over time, even if not very rapidly. Therefore, methods must be provided to update the offset adjustment maps in the field. It would be very time consuming to repeat the full initial characterization under all conditions of usage first characterized at panel manufacture. In addition, time taken for panel calibration interferes with normal hospital or clinic workflow and must be kept as short as possible. Therefore, it is generally advantageous to perform the field update of the offset adjustment map under only a single condition of use. The metadata and offset adjustment map corresponding to this condition are referred to as "reference metadata" and "reference offset adjustment map." More details regarding the field updates of the reference offset adjustment map are given in FIGS. 19-22.

Figure 17:
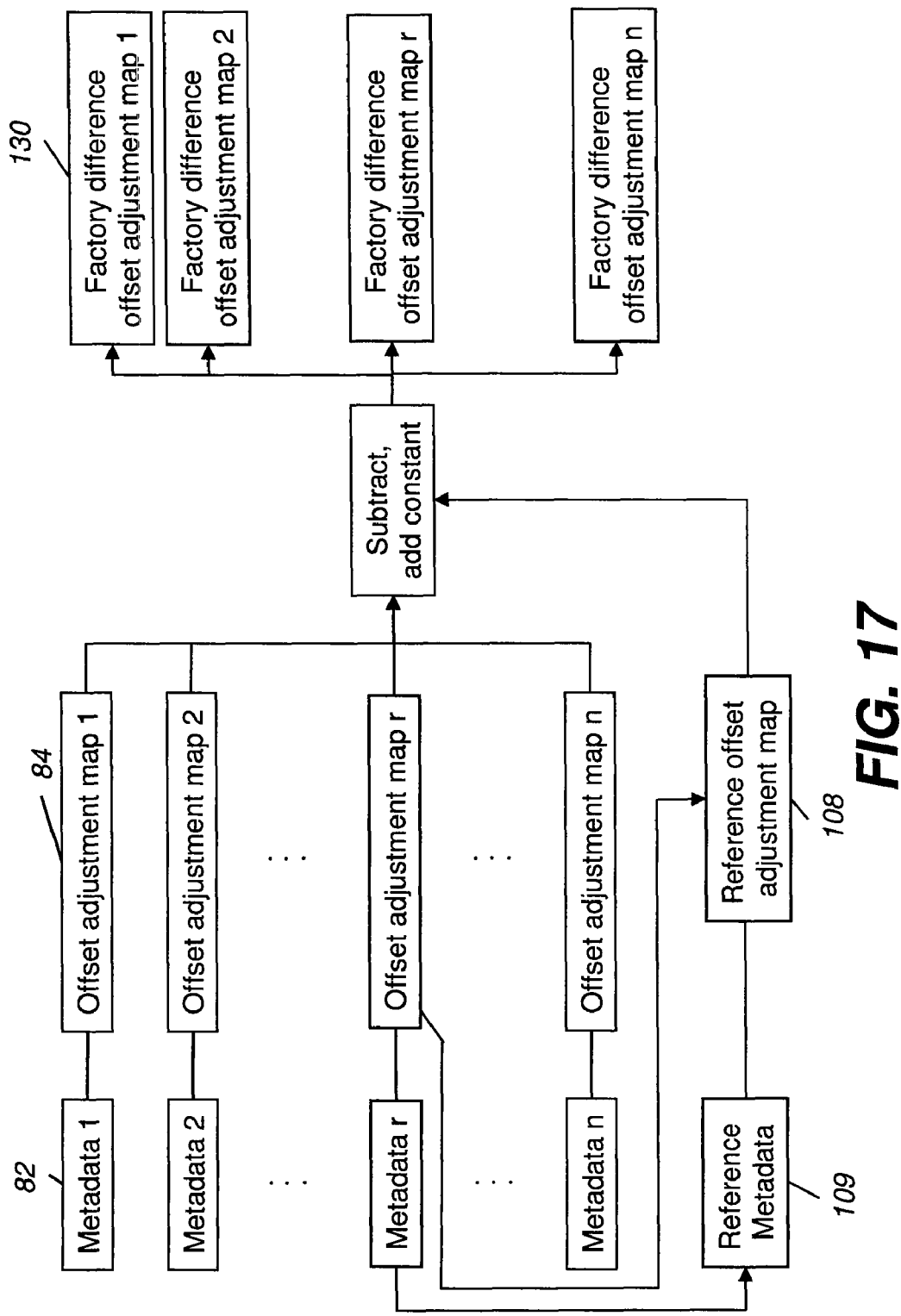
FIG. 17 shows the conversion of a set of metadata and the corresponding offset adjustment maps into a reference offset adjustment map and a set of difference offset adjustment maps.
Figure 18:
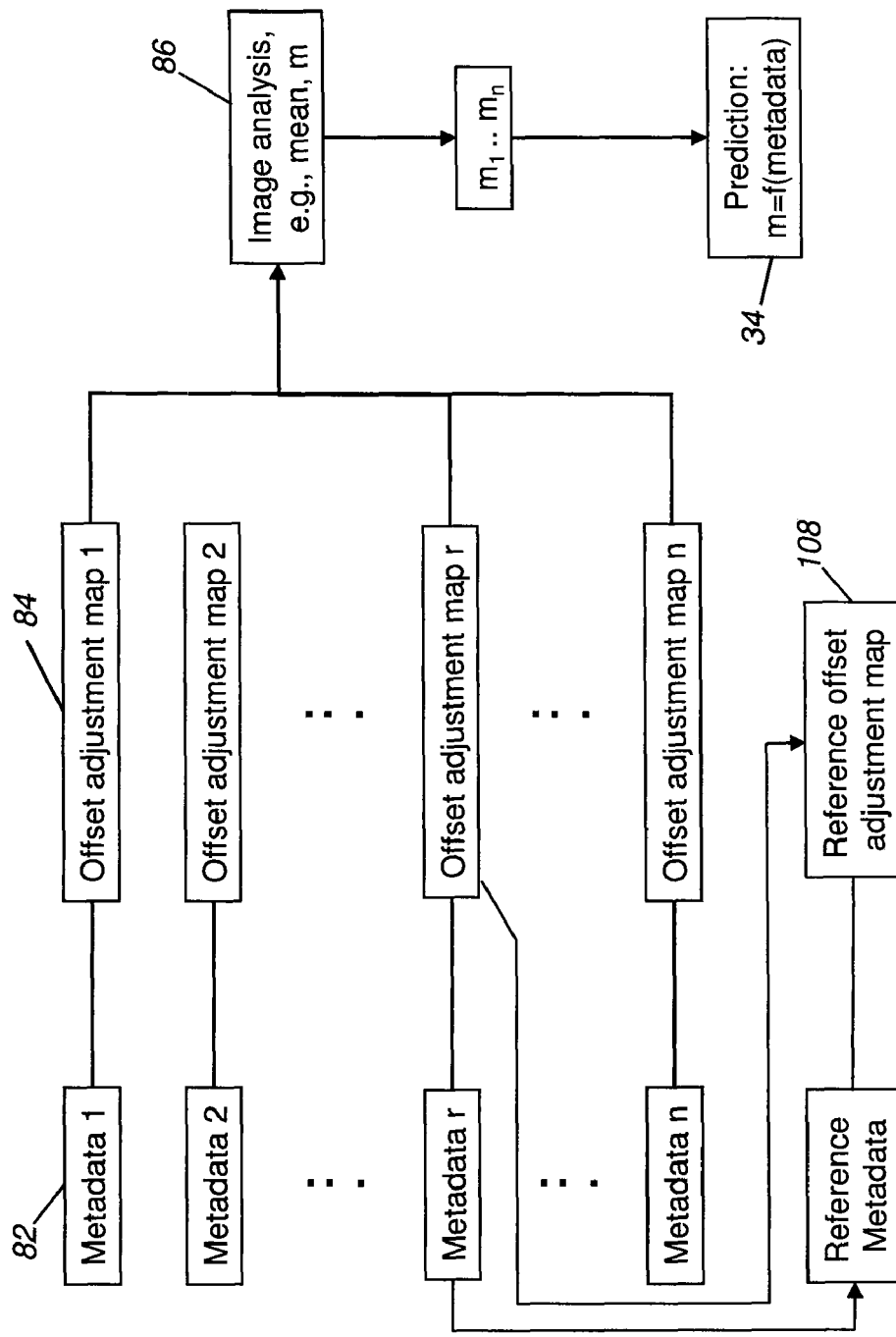
FIG. 18 shows the conversion of a set of metadata and the corresponding offset adjustment maps to a reference offset adjustment map and a function predicting a statistical measure of the offset adjustment maps from the metadata.

With the need for this type of field calibration in mind, it is advantageous to transform the offset adjustment maps $DD_k$ that were generated according to the methods illustrated in FIGS. 14 and 15 to another format, based on the concept of the reference offset adjustment map. Two embodiments of this transformation are shown in FIGS. 17 and 18. In the first embodiment, shown in FIG. 17, reference offset adjustment map 108 and a set of difference offset adjustment maps 130 that represent the difference between the offset adjustment maps 84, $DD_k$, obtained for usage conditions (metadata 82) k, and reference offset adjustment map 108 together with the corresponding reference metadata 109 are stored. Optionally, arbitrary shift values may be added to the difference offset adjustment maps for storage in unsigned integer format.

FIG. 18 shows a sequence by which the reference offset adjustment map 108 and the corresponding metadata 109 are selected from the set of offset adjustment maps $DD_k$ 84 that were obtained for usage conditions (metadata 82) k. Image analysis 86 can then be carried out on the set of maps 84 to generate statistical measures such as mean or median values. A prediction function, given earlier as functional form 34, is then generated from the results of this analysis and values of metadata 82.

Update Function for Offset Adjustment Map

It is expected that the offset adjustment maps change over time. Thus, updates of the maps, in particular reference offset adjustment maps 108, must be performed at regular intervals. These updates must be performed while the panel is not used and not needed for patient images. For a battery-powered detector, another requirement is that the updates be performed as infrequently as possible in order to conserve battery power.

Figure 19:
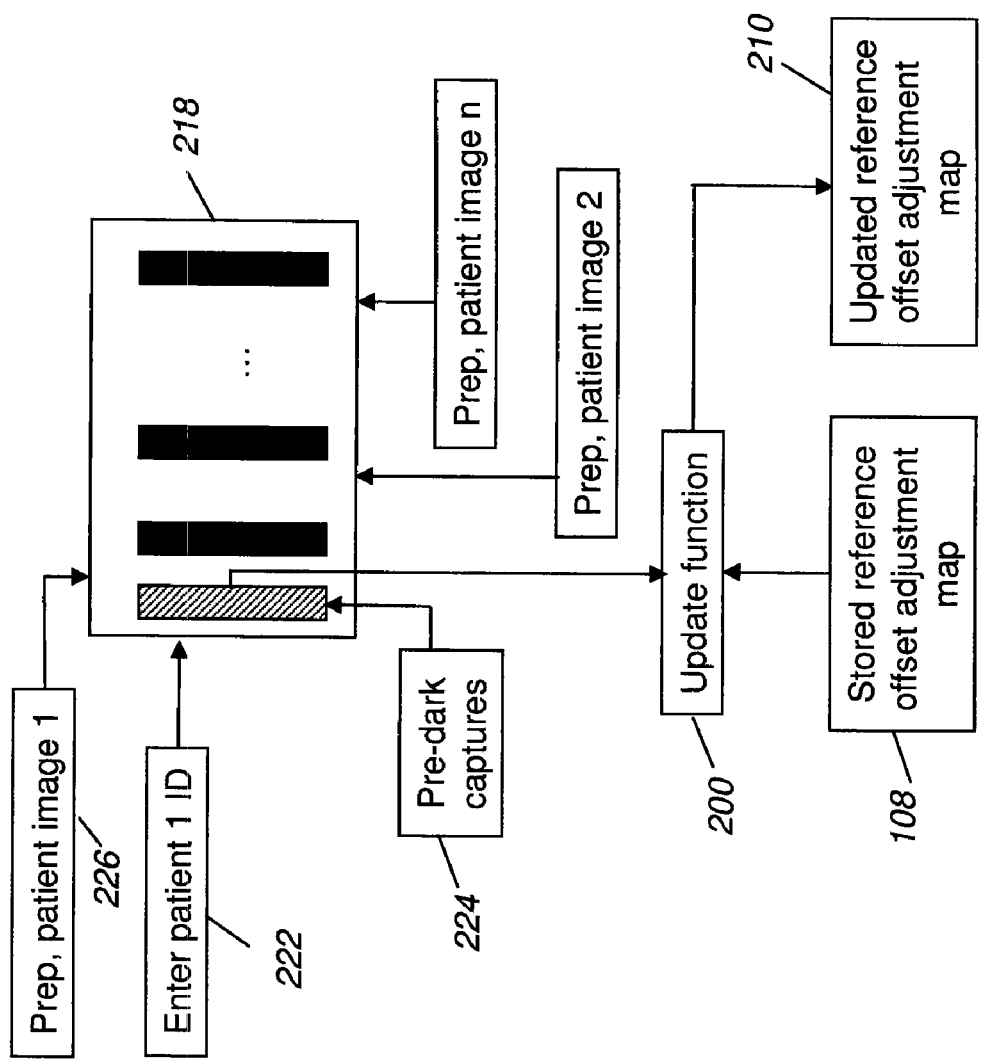
FIG. 19 is a block diagram showing a sequence for capturing sets of dark images for updating an offset adjustment map.
Figure 20:
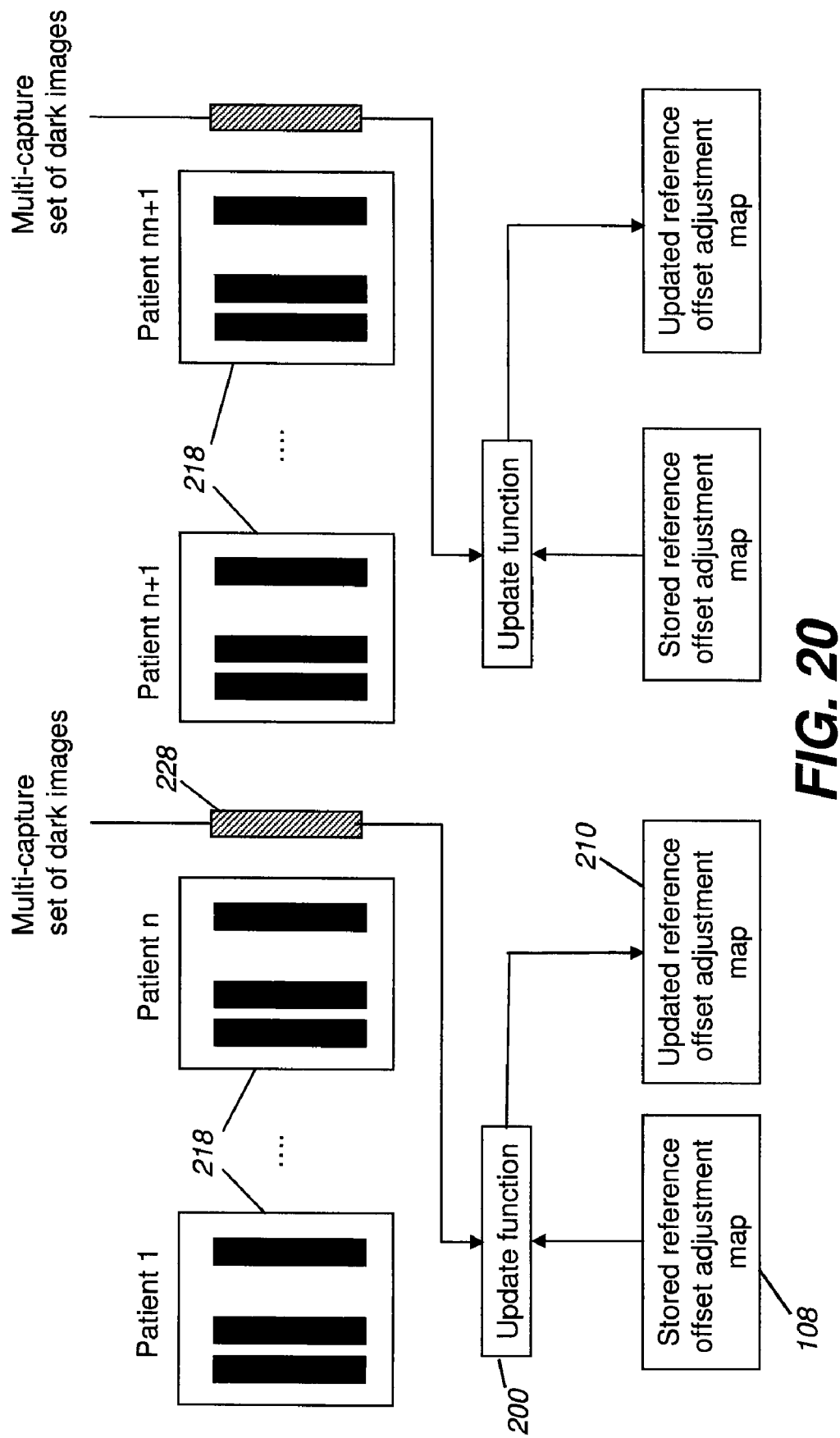
FIG. 20 is a block diagram showing an alternative sequence for capturing sets of dark images for updating an offset adjustment map.

FIGS. 19 and 20 show two examples of how the updates of reference offset adjustment map 108 can be adapted to the workflow such that they are conducted between patient images. FIG. 19 shows an update process for providing an updated reference offset adjustment map 210 that replaces the existing reference offset adjustment map 108 in one embodiment. One convenient workflow stage during which update of reference offset adjustment map 108 may be performed is at the beginning of a study 218 for a patient, during the time required for the operator to enter patient data 222 on the host computer. One or more dark images 224 acquired in multi-capture mode, shown as pre-dark images in FIG. 19, are obtained prior to the first exposure for the patient, that is, prior to activating the Prep button (Prep/expose control 120 in FIG. 4) for this exposure for Prep initiation 226. The current reference offset adjustment map 108 and the captured pre-dark images 224 are input to an update function 200, which generates updated reference offset adjustment map 210. Update function 200 is described in more detail in FIG. 21. This process can be repeated for each patient study 218, or can be repeated periodically, according to some predetermined logic that determines the frequency for updates.

FIG. 20 shows an alternate sequence for updating existing reference offset adjustment map 108. In this sequence, dark images 228, captured in multi-capture mode, are obtained between studies 218 for different patients. The current reference offset adjustment map 108 and the dark images 228 acquired in multi-capture mode are input to update function 200, which generates updated reference offset adjustment map 210. This process can be repeated between each study 218 or can be repeated periodically, according to some predetermined logic that determines the frequency for update.

FIG. 21 shows a block diagram for updating the reference offset adjustment map 108 in update function 200. Offset adjustment map 60 is calculated from the dark image 228 captures in multi-capture mode as was shown earlier for dark images 44 with reference to FIG. 8B. Frequency decomposition utilities such as those described by spatial frequency processing method 370 in connection with FIG. 16 for obtaining offset adjustment maps may be applied to reduce noise in the map. Optionally, offset adjustment map 60 may be compared with reference offset adjustment map 108, and a difference image 338 is formed, for which statistical measures 340 are calculated.

In the embodiment of FIG. 21 the resulting difference image 338 is analyzed for uniformity and at least one statistical measure $X_i$ is calculated, where i is the index of the measure with $i>=1$. If both maps were identical except for electronic noise, the difference image 338 would be a slightly noisy flat field. As offset adjustment map 60 changes over time, some small nonuniformities are expected in difference image 338. If these differences, however, exceed a certain threshold $T_i$ for each measure $X_i$, a malfunction of DR detector 10 may have occurred and an update of reference offset adjustment map 108 is undesirable until the problem is addressed and corrected. In a comparison 358, the calibration software determines if offset adjustment map 60 is consistent with reference offset adjustment map 108. If statistical measures 340 calculated on the difference image 338 fall below a preset threshold, the update is performed. In the opposite case, a warning message 360 is displayed to the user and no update is performed. Updated reference offset adjustment map 210 is calculated as a weighted average of stored reference offset adjustment map 108 and offset adjustment map 372. The weights may fall in the range $[0 \ldots 1]$, where 0 corresponds to a replacement of the reference offset adjustment map 108 with offset adjustment map 372, and 1 corresponds to a situation where no update is performed. The weighting factor w may be preset or calculated based on the difference between the statistical measures and the thresholds used in comparison 358. One method of characterizing non-uniformities in the difference image 338 is to divide the image into rectangular regions of interest and to calculate means and standard deviations for every region of interest. An example of a threshold measure is the maximum difference between the results for all Regions of Interest (ROIs) relative to the mean over all ROIs.

Figure 22:
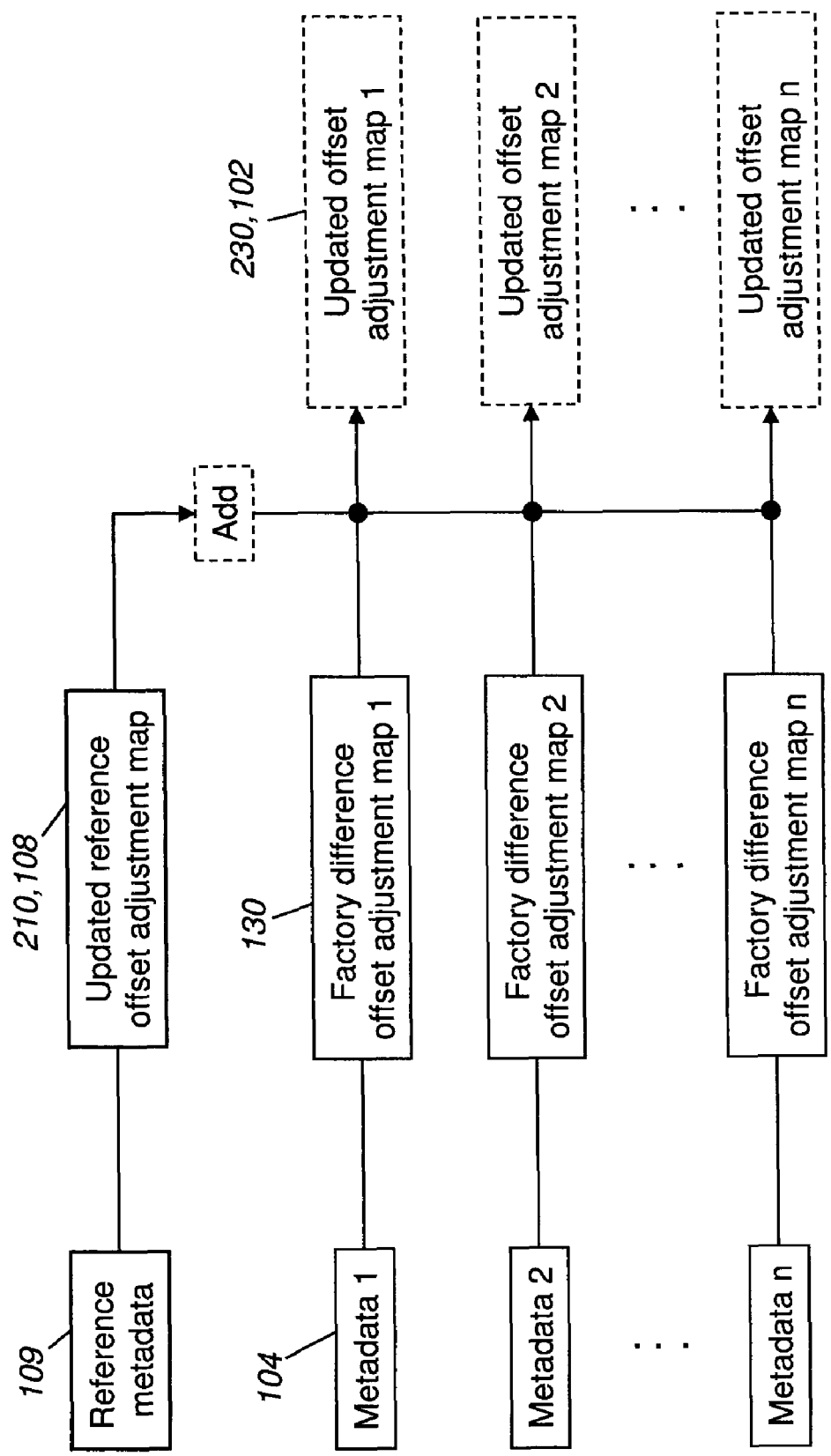
FIG. 22 is a block diagram illustrating a method for calculating updated offset adjustment maps from updated reference offset adjustment maps and a set of factory difference offset adjustment maps.

For increased computing speed of the offset correction algorithm the set of stored offset adjustment maps 102 (FIG. 9) may also be updated. FIG. 22 shows a block diagram for calculating updated offset adjustment maps 230 from updated reference offset adjustment map 210 and a set of factory difference offset adjustment maps 130 (see FIG. 17). As illustrated, the updated offset adjustment maps 230 are generated for all stored sets of metadata 104.

Sample Study

As discussed in detail above, the present invention generally is directed to conservation of power, preferably to prolong batter life in a battery-powered detector. The use of battery power presents unique challenges, because the life of the battery must be balanced against performance criteria for the detector. Ideally, images resulting from the battery-powered detector should be as good as those from fully-powered, or plugged-in, detectors, without the need to continuously change batteries.

In a battery-powered detector such as that according to the invention, images are taken before the detector panel has reached a steady state. For example, the detector experiences significant local warmup from electronic components such as regulators and readout ASICs as it transitions from low to high power. The exposure is on a steeper part of this warmup curve than dark images taken after exposure. Moreover, the duration of the detector operations before the exposure does not match the duration of similar operations before the post-exposure dark images, resulting in differences in charge distribution in both cases. Matching both times would significantly delay the image availability for long prep times. The differences manifest themselves in mean shifts and two-dimensional non-uniformities between the dark image corresponding to the exposure and the post-exposure dark images used for offset correction. If uncorrected, they may affect the detectability of disease features.

The effectiveness of the detector characterization and the offset correction algorithm of the present invention was evaluated by running a use case on a new 35×43 $cm^2$ portable digital X-ray detector based on MIS photo-diodes under ambient temperatures between 15 and 35° C. The use case consisted of 72 flat field exposures captured in multi-capture mode (0.2 mR under RQA-5 beam conditions), randomizing time between studies (1 to 70 min), time between images within a study (2 to 120 s) and prep time (2 to 15 s) within practical limits. Gain and offset corrections were applied to the images.

The differences were mitigated by setting a minimum time limit for the detector to stabilize before the exposure and by optimizing the duration of detector refresh operations before dark image integration to manage the a-Si:H metastable states.

The systematic differences between the dark image corresponding to the exposure and the post-dark images for offset compensation were characterized as a function of prep time.

The Prep and Expose signals from the user were replaced with equivalent signals from the embedded electronic circuitry on the detector such that a dark image was captured instead of the exposure under the same conditions. Multiple image sets were captured in multi-capture mode, averaged and stored as "offset adjustment maps." These maps were independent of the time between images in low power state.

The relevant image quality criteria, e.g., signal stability, image noise and image uniformity, were obtained by dividing the image into 3×3 cm partially overlapping regions of interest (ROIs). The median of the ROI means and standard deviations served as measures of the overall signal and noise. Signal stability throughout the use case was expressed as the standard deviation of signal over all exposures divided by the mean. Uniformity was assessed based on the global variation of signal (GVS), which was defined as the difference between the maximum and minimum of all ROIs divided by the mean of all ROIs, and the global variation of noise (GVN), which was defined similarly using the standard deviations of the ROIs instead of the means. GVN and GVS were also averaged over the use case.

Table 1 shows a comparison of power consumption, critical workflow and image quality parameters for the battery-powered detector in comparison with a fully powered detector based on the same MIS photodiode technology and the same detector operating cycle in the high power state. Two image correction options were compared for the portable detector: (1) offset corrections based on the simple subtraction of the averaged post-dark images, and (2) offset corrections with the addition of a prep-time referenced offset adjustment map. Power consumption estimates for the battery-powered detector were based on the average use case of 30 exposures per hour with two post-dark images, three seconds per image plus an average of one second for additional prep time. Relatively few trade-offs in terms of workflow were made compared with the fully powered panel, except for requiring a minimum prep time and longer time to image display. However, the actual times achieved fall within the ranges typical for digital radiography panels on the market. A small trade-off was made in terms of image noise. The level of electronic noise in the running average of periodically updated dark images is at least by a factor of 10 lower compared with a single image capture. Assuming electronic noise is random from capture to capture an offset map made from two dark images is only by a factor of 1.4 lower than the noise from a single capture. This manifests itself in an increase in overall noise of 5.5% from the fully powered to the battery-powered version at an exposure of 0.2 mR. Correction option 2 for the battery-powered detector achieved similar performance in terms of signal stability and image uniformity as the fully powered stable detector.

TABLE 1

Comparison of critical workflow, power and image quality parameters for a fully and a battery-powered a-Si:H detector.

| Metric | Fully powered | Battery-powered (1) | Battery-powered (2) |
| --- | --- | --- | --- |
| Average power use (Wh) | 25 | 3.5 | 3.5 |
| Minimum prep time (s) | 0 | 1.5 | 1.5 |
| Exposure lag (ms) | <240 | <240 | <240 |
| Dark calibration | Periodic update | 2 post-darks | 2 post-darks |
| Time to image display (s) | 6.3 | 12 | 12.2 |
| Signal stability (%) | 0.9 | 1.3 | 0.9 |
| Noise (ADC) | 3.5 | 3.8 | 3.7 |
| GVS (%) | 0.8 | 3.3 | 1.0 |
| GVN (%) | 6.5 | 6.9 | 6.7 |

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, various types of user event and exposure metadata can be associated with stored offset adjustment maps.

Thus, what is provided is a method for dark signal correction in digital radiography.

PARTS LIST

10. DR panel detector
14. Scintillator
20. Flat panel detector
22. Photosensor
24. Pixel
25. Readout element
26. Switch element
28. Embedded electronic circuitry
29. Power Supply
30. Usermetadata
32. Image metadata
34. Functional form or LUT
36. Comparison
38. Selection or interpolation process
40. Offset adjustment map
44. Dark image
50. Dark corrected exposure
52. User Metadata
54. Dark image
60. Offset adjustment map
66. Low-pass map
70. Low-pass filter
72. High-pass map
74. Local average
78. Averaged high-pass map
80. Final offset adjustment map
82. Metadata
84. Offset adjustment map
86. Image analysis
100. Digital radiographic system
102, 108. Offset adjustment map
104. Stored metadata
106. Metadata
108. Reference offset adjustment map
109. Reference metadata
110. Interpolation algorithm
112. Generator
114. Interface box
116. Host computer
118. User interface
119, 121. Communication link
120. Prep/expose control
122. Selection algorithm
130. Difference offset adjustment map
200. Update function
210. Updated reference offset adjustment map
218. Study
222. Patient data
224. Set of dark images
226. Prep initiation
228. Set of dark images
230. Updated offset adjustment map
300. Embedded controller
302. Image memory
304. Control register 338. Difference image
340. Statistical measures
358. Comparison
360. Warning message
370. Method of computing offset adjustment maps
372. Offset adjustment map
S100. Step
S110. Step
S120. Step
S130. Step
S140. Step
E. Enlarged section

The invention claimed is:

1. A method of forming an offset-corrected exposure image comprising:
   obtaining an initial exposure image and exposure metadata related to the initial exposure image;
   forming an intermediate offset-corrected exposure image by obtaining one or more dark images associated with the initial exposure image and subtracting an averaged value of the more than one dark images from the initial exposure image or subtracting a value of a single dark image from the initial exposure image; and
   forming the offset-corrected exposure image by combining an offset adjustment map with the intermediate offset-corrected exposure image, wherein the offset adjustment map is created using stored dark image data and associated stored metadata.

2. The method of claim 1 wherein the stored dark image data is from one or more previously-captured dark images and the offset adjustment map is created by:
   capturing the set of dark images;
   processing the set of the captured dark images to form at least one stored offset adjustment map; and
   selecting the at least one stored offset adjustment map stored metadata that is related to the capture of at least some of the processed, captured dark images.

3. The method of claim 2 wherein the at least one stored offset adjustment map is formed using an average of one or more sets of the previously captured and processed dark images of a digital radiography detector acquired for a single set of stored metadata.

4. The method of claim 2 wherein processing the set of the previously captured dark images to form at least one stored offset adjustment map further comprises decomposing the at least one stored offset adjustment map into high and low frequency maps.

5. The method of claim 4 further comprising applying one or more smoothing operations to at least one of the high or low frequency maps.

6. The method of claim 2 further comprising:
   selecting the at least one stored offset adjustment map as a reference offset adjustment map;
   calculating and storing the differences between values in the selected reference offset adjustment map and at least one of the stored offset adjustment maps to form a corresponding difference offset adjustment map with associated stored metadata; and
   storing the reference offset adjustment map and the difference offset adjustment maps and their associated metadata.

7. The method of claim 6 further comprising updating at least one stored offset adjustment map by combining an updated reference offset adjustment map with one of a set of stored difference offset adjustment maps.

8. The method of claim 2 wherein the set of previously captured dark images is obtained at the time of manufacture of a digital X-ray detector.

9. The method of claim 2 wherein at least one of the steps of acquiring the set of the previously captured dark images, processing the set of the previously captured dark images, and associating the at least one stored offset adjustment map with stored metadata is performed by embedded circuitry on the digital X-ray detector.

10. The method of claim 2 wherein the stored offset adjustment map is formed from previously captured dark images obtained in a characterization step executed at least in part by embedded circuitry on a digital X-ray detector.

11. The method of claim 10 wherein the previously captured dark images obtained in the characterization step are captured under conditions that correspond to discrete sets of exposure metadata related to the initial exposure image.

12. The method of claim 1 wherein the offset-oriented exposure image is from a battery powered X-ray detector.

13. The method of claim 1 wherein the associated exposure metadata comprises one or more of a time interval within a power state, an elapsed time since last exposure for a digital X-ray detector, a temperature measurement, duration of a prep time before an X-ray exposure, and a detector identification.

14. The method of claim 1 wherein the offset adjustment map is formed by interpolating code values between previously-stored offset adjustment maps.

15. The method of claim 1 wherein the offset adjustment map is formed using the exposure metadata in one of a prediction function and a look-up table developed from one or more previously-captured dark images and their associated metadata.

16. The method of claim 1 wherein forming the offset adjustment map further comprises updating the previously-captured dark image data with newly obtained dark image data.

17. The method of claim 16 wherein updating is at least one of automatic and periodic.

18. The method of claim 16 wherein updating uses weighted values between the stored reference offset adjustment map and newly obtained dark image data.

19. The method of claim 18 wherein the weighted values are based upon one or more of a time, an elapsed time, a temperature, and a statistical difference measure between the stored reference offset adjustment map and the newly obtained dark image data.

20. A digital radiography system comprising:
   a digital radiography detector adapted to capture an initial exposure image and one or more dark images associated with the initial exposure image and to generate first metadata related to the initial exposure image and second metadata related to the one or more dark images associated with the initial exposure image;
   a power source providing power to the digital radiography detector;
   a host computer in communication with the digital radiography detector;
   a memory in at least one of the digital radiography detector and the host computer storing a plurality of stored dark images and stored third metadata corresponding to the stored dark images; and
   available on one or both of the digital radiography detector and the host computer:

a first processor forming an intermediate offset-corrected exposure image by modifying the initial exposure image using the one or more dark images associated with the initial exposure image;

a second processor obtaining an offset adjustment map using the plurality of stored dark images and stored third metadata; and a third processor forming an offset-corrected exposure image by combining the offset adjustment map with the intermediate offset-corrected exposure image.

21. The system of claim 20 wherein the plurality of stored dark images comprises a plurality of offset adjustment maps.

22. The system of claim 21 further comprising a user input for inputting commands to alternate between power states.

23. The system of claim 20 wherein the power source is a battery and the digital radiography detector communicates with the host computer over a wireless connection.

24. The system of claim 20 further comprising a display device displaying a final image incorporating the offset-corrected exposure image, where the intermediate offset-corrected exposure image was formed by subtracting an averaged value of the more than one dark images from the initial exposure image or subtracting a value of a single dark image from the initial exposure image, and wherein the digital radiography detector is a portable digital radiography detector.

25. A method of forming a radiographic offset-corrected exposure image comprising:

obtaining an initial exposure image and exposure metadata related to a time interval within a power state, an elapsed time since last exposure or duration of a prep time before exposure for the initial exposure image of a flat panel radiographic detector;

forming an intermediate offset-corrected exposure image by obtaining one or more dark images of the flat panel radiographic detector associated with the initial exposure image and forming the intermediate offset-corrected exposure image by using the one or more dark images associated with the initial exposure image and the initial exposure image; and forming the offset-corrected exposure image by combining an offset adjustment map with the intermediate offset-corrected exposure image, wherein the offset adjustment map is created using stored dark image data and associated stored metadata of the flat panel radiographic detector.

* * * * *